(12) United States Patent
Huang et al.

(10) Patent No.: US 12,399,343 B2
(45) Date of Patent: Aug. 26, 2025

(54) IMAGING LENS ASSEMBLY AND ELECTRONIC DEVICE

(71) Applicant: LARGAN PRECISION CO., LTD., Taichung (TW)

(72) Inventors: Hsuan-Chin Huang, Taichung (TW); Chen-Wei Fan, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 424 days.

(21) Appl. No.: 18/151,508

(22) Filed: Jan. 9, 2023

(65) Prior Publication Data

US 2023/0236382 A1    Jul. 27, 2023

Related U.S. Application Data

(60) Provisional application No. 63/302,588, filed on Jan. 25, 2022.

(30) Foreign Application Priority Data

Jul. 8, 2022   (TW) .................................. 111125766

(51) Int. Cl.
*G02B 7/02*   (2021.01)
*G02B 13/00*  (2006.01)
(52) U.S. Cl.
CPC ............. *G02B 7/023* (2013.01); *G02B 7/021* (2013.01); *G02B 7/028* (2013.01); *G02B 13/0045* (2013.01)

(58) Field of Classification Search
CPC ........ G02B 7/023; G02B 7/028; G02B 7/021; G02B 13/0045
See application file for complete search history.

(56) References Cited

U.S. PATENT DOCUMENTS

| | | | |
|---|---|---|---|
| 7,755,858 B2 | 7/2010 | Chen | |
| 8,570,672 B2 | 10/2013 | Lin | |
| 9,250,364 B2 | 2/2016 | Hou | |
| 9,465,187 B2 | 10/2016 | Calvet | |

(Continued)

FOREIGN PATENT DOCUMENTS

| CN | 101672964 A | 3/2010 |
|---|---|---|
| CN | 105093467 A | 11/2015 |

(Continued)

*Primary Examiner* — Jia X Pan
(74) *Attorney, Agent, or Firm* — McClure, Qualey & Rodack, LLP

(57) ABSTRACT

An imaging lens assembly includes a first lens element, a second lens element and a lens barrel, and an optical axis passes through the imaging lens assembly. One of the space adjusting structures is formed via a first peripheral portion of the first lens element and a plate portion of the lens barrel, the other one of the space adjusting structures is formed via the first peripheral portion of the first lens element and a second peripheral portion of the second lens element. Each of the space adjusting structures includes a frustum surface, a spatial frustum surface, a corresponding structure and a spatial layer. Each of the frustum surfaces and each of the spatial frustum surfaces are disposed on an object-side surface of the first peripheral portion and an object-side surface of the second peripheral portion, respectively.

36 Claims, 25 Drawing Sheets

(56) References Cited

U.S. PATENT DOCUMENTS

| | | | |
|---|---|---|---|
| 9,507,116 B2 | 11/2016 | Choi | |
| 9,759,885 B2 * | 9/2017 | Yan | G02B 7/021 |
| 9,857,551 B2 * | 1/2018 | Yan | G02B 7/003 |
| 9,910,238 B2 * | 3/2018 | Yan | G02B 7/003 |
| 12,007,589 B2 | 6/2024 | Tsai et al. | |
| 2009/0015945 A1 | 1/2009 | Chen | |
| 2009/0174954 A1 | 7/2009 | Hara | |
| 2013/0050850 A1 * | 2/2013 | Lin | G02B 7/021 |
| | | | 359/738 |
| 2015/0092270 A1 * | 4/2015 | Wang | G02B 7/022 |
| | | | 359/503 |
| 2020/0073077 A1 | 3/2020 | Kanzaki | |
| 2021/0302805 A1 * | 9/2021 | Yoshida | G02B 7/021 |
| 2022/0350105 A1 * | 11/2022 | Tsai | G02B 7/021 |

FOREIGN PATENT DOCUMENTS

| | | |
|---|---|---|
| CN | 208636525 U | 3/2019 |
| CN | 210222336 U | 3/2020 |
| CN | 215116943 U | 12/2021 |
| JP | 2003075698 A | 3/2003 |
| TW | 200903067 A | 1/2009 |
| TW | 201430434 A | 8/2014 |

\* cited by examiner

IMAGING LENS ASSEMBLY AND ELECTRONIC DEVICE

RELATED APPLICATIONS

This application claims priority to U.S. Provisional Application Ser. No. 63/302,588, filed Jan. 25, 2022 and Taiwan Application Serial Number 111125766, filed Jul. 8, 2022, which are herein incorporated by reference.

BACKGROUND

Technical Field

The present disclosure relates to an imaging lens assembly. More particularly, the present disclosure relates to an imaging lens assembly applicable to portable electronic devices.

Description of Related Art

In recent years, portable electronic devices have developed rapidly. For example, intelligent electronic devices and tablets have been filled in the lives of modern people, and imaging lens assemblies mounted on portable electronic devices have also prospered. However, as technology advances, the quality requirements of the imaging lens assembly are becoming higher and higher. Therefore, an imaging lens assembly, which can maintain the assembling stability under the different environmental conditions, needs to be developed.

SUMMARY

According to one aspect of the present disclosure, an imaging lens assembly includes a first lens element, a second lens element, a lens barrel and two space adjusting structures, and an optical axis passes through the imaging lens assembly. The first lens element includes a first optical effective portion and a first peripheral portion. The optical axis passes through the first optical effective portion, and the first peripheral portion is disposed around the first optical effective portion. The second lens element is disposed on an image side of the first lens element, and includes a second optical effective portion and a second peripheral portion. The optical axis passes through the second optical effective portion, the second peripheral portion is disposed around the second optical effective portion, and an object-side surface of the second peripheral portion is directly contacted with an image-side surface of the first peripheral portion. The lens barrel includes a cylindrical portion and a plate portion. The cylindrical portion surrounds the optical axis with the optical axis as an axis, the plate portion is connected to the cylindrical portion, extends towards a direction close to the optical axis to form a light through hole, an accommodating space is formed via the cylindrical portion and the plate portion, the first lens element and the second lens element are disposed in the accommodating space, and an image-side surface of the plate portion is directly contacted with an object-side surface of the first peripheral portion. One of the space adjusting structures is formed via the first peripheral portion of the first lens element and the plate portion of the lens barrel, and the other one of the space adjusting structures is formed via the first peripheral portion of the first lens element and the second peripheral portion of the second lens element. The one of the space adjusting structures includes a frustum surface, a spatial frustum surface, a corresponding structure and a spatial layer. The frustum surface is disposed on the object-side surface of the first peripheral portion and disposed around the optical axis, and an object-side end of the frustum surface is closer to the optical axis than an image-side end of the frustum surface to the optical axis. The spatial frustum surface is disposed on the object-side surface of the first peripheral portion and disposed around the optical axis, and an object-side end of the spatial frustum surface is farther from the optical axis than an image-side end of the spatial frustum surface from the optical axis. The corresponding structure is disposed on the image-side surface of the plate portion and correspondingly disposed on the frustum surface and the spatial frustum surface. The spatial layer is formed between the spatial frustum surface and the corresponding structure, so that the spatial frustum surface and the corresponding structure are disposed at intervals. The other one of the space adjusting structures includes a frustum surface, a spatial frustum surface, a corresponding structure and a spatial layer. The frustum surface is disposed on the object-side surface of the second peripheral portion and disposed around the optical axis, and an object-side end of the frustum surface is farther from the optical axis than an image-side end of the frustum surface from the optical axis. The spatial frustum surface is disposed on the object-side surface of the second peripheral portion and disposed around the optical axis, and an object-side end of the spatial frustum surface is closer to the optical axis than an image-side end of the spatial frustum surface to the optical axis. The corresponding structure is disposed on the image-side surface of the first peripheral portion and correspondingly disposed on the frustum surface and the spatial frustum surface. The spatial layer is formed between the spatial frustum surface and the corresponding structure, so that the spatial frustum surface and the corresponding structure are disposed at intervals. When the imaging lens assembly is in a first environment, a minimum spacing distance between the spatial frustum surface and the corresponding structure of the one of the space adjusting structures is $G\alpha$, a minimum spacing distance between the spatial frustum surface and the corresponding structure of the other one of the space adjusting structures is $G\beta$; when the imaging lens assembly is in a second environment, the minimum spacing distance between the spatial frustum surface and the corresponding structure of the one of the space adjusting structures is $G\alpha'$, the minimum spacing distance between the spatial frustum surface and the corresponding structure of the other one of the space adjusting structures is $G\beta'$, and the following conditions are satisfied: $0\ \mu m \leq G\alpha' < G\alpha \leq 37\ \mu m$; and $0\ \mu m \leq G\beta' < G\beta \leq 38\ \mu m$. The first environment and the second environment are satisfied at least one of a temperature-dependent relation and a humidity-dependent relation: a temperature of the first environment being Ta, a temperature of the second environment being Tb, and the temperature-dependent relation satisfied: $6K \leq |Ta-Tb| \leq 148K$; and a relative humidity of the first environment being RHa, a relative humidity of the second environment being RHb, and the humidity-dependent relation satisfied: $7\% \leq |RHa-RHb| \leq 89\%$.

According to one aspect of the present disclosure, an imaging lens assembly includes a first lens element, a lens barrel and a space adjusting structure, and an optical axis passes through the imaging lens assembly. The first lens element includes a first optical effective portion and a first peripheral portion. The optical axis passes through the first optical effective portion, and the first peripheral portion is disposed around the first optical effective portion. The lens barrel includes a cylindrical portion and a plate portion. The cylindrical portion surrounds the optical axis with the optical axis as an axis, the plate portion is connected to the cylindrical portion, extends towards a direction close to the optical axis to form a light through hole, an accommodating space is formed via the cylindrical portion and the plate portion, the first lens element is disposed in the accommodating space, and an image-side surface of the plate portion is directly contacted with an object-side surface of the first peripheral portion. The space adjusting structure is formed via the first peripheral portion of the first lens element and the plate portion of the lens barrel, and the space adjusting structure includes a frustum surface, a spatial frustum surface, a corresponding structure and a spatial layer. The frustum surface is disposed on the object-side surface of the first peripheral portion and disposed around the optical axis, and an object-side end of the frustum surface is closer to the optical axis than an image-side end of the frustum surface to the optical axis. The spatial frustum surface is disposed on the object-side surface of the first peripheral portion and disposed around the optical axis, and an object-side end of the spatial frustum surface is farther from the optical axis than an image-side end of the spatial frustum surface from the optical axis. The corresponding structure is disposed on the image-side surface of the plate portion and correspondingly disposed on the frustum surface and the spatial frustum surface. The spatial layer is formed between the spatial frustum surface and the corresponding structure, so that the spatial frustum surface and the corresponding structure are disposed at intervals. When the imaging lens assembly is in a first environment, a minimum spacing distance between the spatial frustum surface and the corresponding structure is G; when the imaging lens assembly is in a second environment, the minimum spacing distance between the spatial frustum surface and the corresponding structure is G', and the following condition is satisfied: $0\ \mu m \le G' < G \le 37\ \mu m$. The first environment and the second environment are satisfied at least one of a temperature-dependent relation and a humidity-dependent relation: a temperature of the first environment being Ta, a temperature of the second environment being Tb, and the temperature-dependent relation satisfied: $6K \le |Ta-Tb| \le 148K$; and a relative humidity of the first environment being RHa, a relative humidity of the second environment being RHb, and the humidity-dependent relation satisfied: $7\% \le |RHa-RHb| \le 89\%$.

According to one aspect of the present disclosure, an imaging lens assembly includes a first lens element, a second lens element, a third lens element and two space adjusting structures, and an optical axis passes through the imaging lens assembly. The first lens element includes a first optical effective portion and a first peripheral portion. The optical axis passes through the first optical effective portion, and the first peripheral portion is disposed around the first optical effective portion. The second lens element is disposed on an image side of the first lens element, and includes a second optical effective portion and a second peripheral portion. The optical axis passes through the second optical effective portion, the second peripheral portion is disposed around the second optical effective portion, and an object-side surface of the second peripheral portion is directly contacted with an image-side surface of the first peripheral portion. The third lens element is disposed on an image side of the second lens element, and includes a third optical effective portion and a third peripheral portion. The optical axis passes through the third optical effective portion, the third peripheral portion is disposed around the third optical effective portion, and an object-side surface of the third peripheral portion is directly contacted with an image-side surface of the second peripheral portion. The one of the space adjusting structures is formed via the first peripheral portion of the first lens element and the second peripheral portion of the second lens element, and the other one of the space adjusting structures is formed via the second peripheral portion of the second lens element and the third peripheral portion of the third lens element. The one of the space adjusting structures includes a frustum surface, a spatial frustum surface, a corresponding structure and a spatial layer. The frustum surface is disposed on the object-side surface of the second peripheral portion and disposed around the optical axis, and an object-side end of the frustum surface is farther from the optical axis than an image-side end of the frustum surface from the optical axis. The spatial frustum surface is disposed on the object-side surface of the second peripheral portion and disposed around the optical axis, and an object-side end of the spatial frustum surface is closer to the optical axis than an image-side end of the spatial frustum surface to the optical axis. The corresponding structure is disposed on the image-side surface of the first peripheral portion and correspondingly disposed on the frustum surface and the spatial frustum surface. The spatial layer is formed between the spatial frustum surface and the corresponding structure, so that the spatial frustum surface and the corresponding structure are disposed at intervals. The other one of the space adjusting structures includes a frustum surface, a spatial frustum surface, a corresponding structure and a spatial layer. The frustum surface is disposed on the object-side surface of the third peripheral portion and disposed around the optical axis, and an object-side end of the frustum surface is closer to the optical axis than an image-side end of the frustum surface to the optical axis. The spatial frustum surface is disposed on the object-side surface of the third peripheral portion and disposed around the optical axis, and an object-side end of the spatial frustum surface is farther from the optical axis than an image-side end of the spatial frustum surface from the optical axis. The corresponding structure is disposed on the image-side surface of the second peripheral portion and correspondingly disposed on the frustum surface and the spatial frustum surface. The spatial layer is formed between the spatial frustum surface and the corresponding structure, so that the spatial frustum surface and the corresponding structure are disposed at intervals. When the imaging lens assembly is in a first environment, a minimum spacing distance between the spatial frustum surface and the corresponding structure of the one of the space adjusting structures is Gγ, a minimum spacing distance between the spatial frustum surface and the corresponding structure of the other one of the space adjusting structures is Gδ; when the imaging lens assembly is in a second environment, the minimum spacing distance between the spatial frustum surface and the corresponding structure of the one of the space adjusting structures is Gγ', the minimum spacing distance between the spatial frustum surface and the corresponding structure of the other one of the space adjusting structures is Gδ'; an abbe number of the second lens element is Vd, and the following conditions are satisfied: $3\ \mu m \le G\gamma' < G\gamma \le 38\ \mu m$; $3\ \mu m \le G\delta' < G\delta \le 39\ \mu m$; and $8 \le Vd \le 29$. The first environment and the second environment are satisfied at least one of a temperature-dependent relation and a humidity-dependent relation: a temperature of the first environment being Ta, a temperature of the second environment being Tb, and the temperature-dependent relation satisfied: $6K \le |Ta-Tb| \le 148K$; and a relative humidity of the first environment being RHa, a relative humidity of the second environment being RHb, and the humidity-dependent relation satisfied: $7\% \le |RHa-RHb| \le 89\%$.

According to one aspect of the present disclosure, an imaging lens assembly includes a first lens element, a second lens element, a third lens element and two space adjusting structures, and an optical axis passes through the imaging lens assembly. The first lens element includes a first optical effective portion and a first peripheral portion. The optical axis passes through the first optical effective portion, and the first peripheral portion is disposed around the first optical effective portion. The second lens element is disposed on an image side of the first lens element, and includes a second optical effective portion and a second peripheral portion. The optical axis passes through the second optical effective portion, the second peripheral portion is disposed around the second optical effective portion, and an object-side surface of the second peripheral portion is directly contacted with an image-side surface of the first peripheral portion. The third lens element is disposed on an image side of the second lens element, and includes a third optical effective portion and a third peripheral portion. The optical axis passes through the third optical effective portion, the third peripheral portion is disposed around the third optical effective portion, and an object-side surface of the third peripheral portion is directly contacted with an image-side surface of the second peripheral portion. One of the space adjusting structures is formed via the first peripheral portion of the first lens element and the second peripheral portion of the second lens element, and the other one of the space adjusting structures is formed via the second peripheral portion of the second lens element and the third peripheral portion of the third lens element. The one of the space adjusting structures includes a frustum surface, a spatial frustum surface, a corresponding structure and a spatial layer. The frustum surface is disposed on the object-side surface of the second peripheral portion and disposed around the optical axis, and an object-side end of the frustum surface is farther from the optical axis than an image-side end of the frustum surface from the optical axis. The spatial frustum surface is disposed on the object-side surface of the second peripheral portion and disposed around the optical axis, and an object-side end of the spatial frustum surface is closer to the optical axis than an image-side end of the spatial frustum surface to the optical axis. The corresponding structure is disposed on the image-side surface of the first peripheral portion and correspondingly disposed on the frustum surface and the spatial frustum surface. The spatial layer is formed between the spatial frustum surface and the corresponding structure, so that the spatial frustum surface and the corresponding structure are disposed at intervals. The other one of the space adjusting structures includes a frustum surface and a corresponding structure. The frustum surface is disposed on the object-side surface of the third peripheral portion and disposed around the optical axis, and an object-side end of the frustum surface is closer to the optical axis than an image-side end of the frustum surface to the optical axis. The corresponding structure is disposed on the image-side surface of the second peripheral portion and correspondingly disposed on the frustum surface. When the imaging lens assembly is in a first environment, a minimum spacing distance between the spatial frustum surface and the corresponding structure of the one of the space adjusting structures is $G\gamma$; when the imaging lens assembly is in a second environment, the minimum spacing distance between the spatial frustum surface and the corresponding structure of the one of the space adjusting structures is $G\gamma'$; an abbe number of the second lens element is Vd, and the following conditions are satisfied: $3\ \mu m \le G\gamma' < G\gamma \le 38\ \mu m$; and $8 \le Vd \le 29$. The first environment and the second environment are satisfied at least one of a temperature-dependent relation and a humidity-dependent relation: a temperature of the first environment being Ta, a temperature of the second environment being Tb, and the temperature-dependent relation satisfied: $6K \le |Ta-Tb| \le 148K$; and a relative humidity of the first environment being RHa, a relative humidity of the second environment being RHb, and the humidity-dependent relation satisfied: $7\% \le |RHa-RHb| \le 89\%$.

According to one aspect of the present disclosure, an electronic device includes the imaging lens assembly of any one of the aforementioned aspects.

DETAILED DESCRIPTION

Figure 1A:
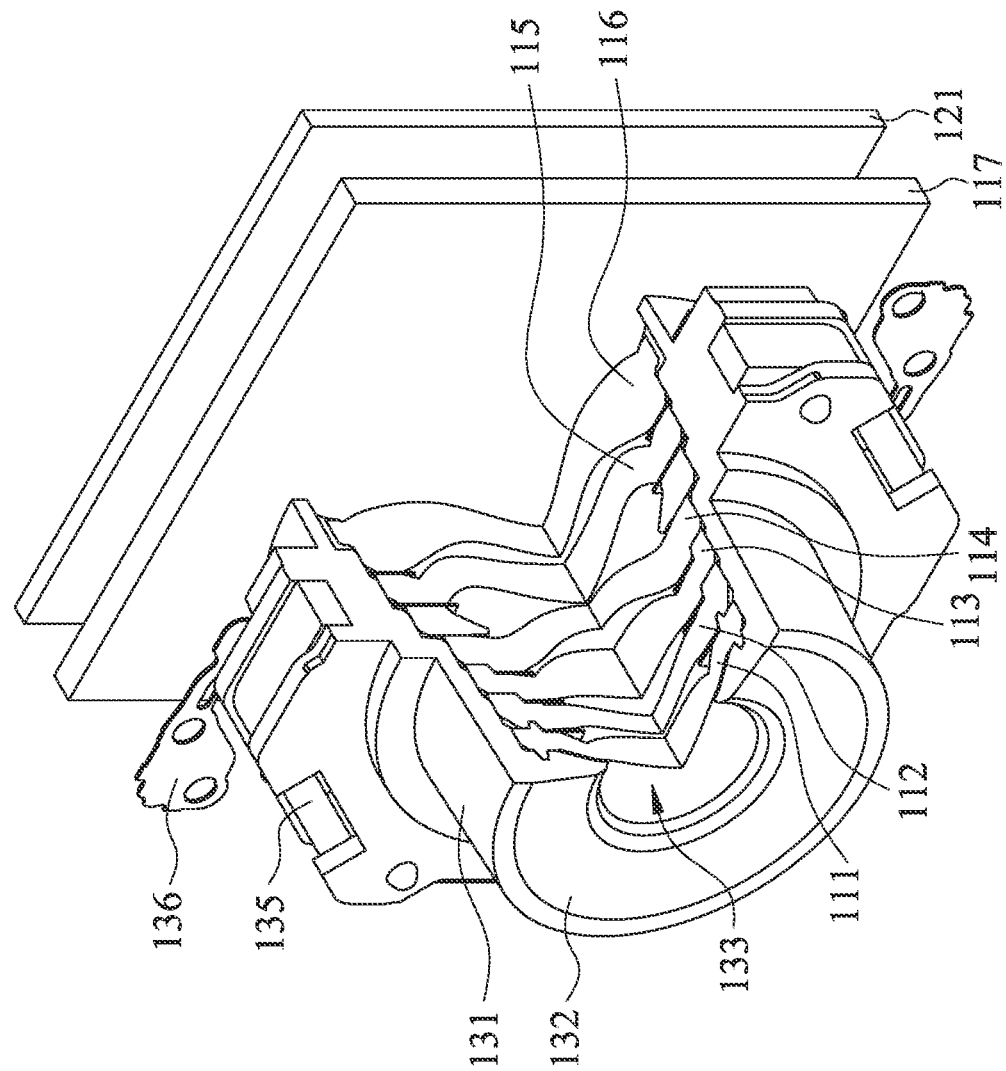
FIG. 1A is a partial cross-sectional view of an imaging lens assembly according to the 1st embodiment of the present disclosure.

The present disclosure provides an imaging lens assembly, and the imaging lens assembly includes a first lens element, a second lens element, a lens barrel and at least one space adjusting structure, wherein an optical axis passes through the imaging lens assembly. The first lens element includes a first optical effective portion and a first peripheral portion, wherein the optical axis passes through the first optical effective portion, and the first peripheral portion is disposed around the first optical effective portion. The second lens element is disposed on an image side of the first lens element, and includes a second optical effective portion and a second peripheral portion, wherein the optical axis passes through the second optical effective portion, the second peripheral portion is disposed around the second optical effective portion, and an object-side surface of the second peripheral portion is directly contacted with an image-side surface of the first peripheral portion. The lens barrel includes a cylindrical portion and a plate portion, wherein the cylindrical portion surrounds the optical axis with the optical axis as an axis, the plate portion is connected to the cylindrical portion and extends towards a direction close to the optical axis to form a light through hole, an accommodating space is formed via the cylindrical portion and the plate portion, the first lens element is disposed in the accommodating space, and an image-side surface of the plate portion is directly contacted with an object-side surface of the first peripheral portion.

Further, the first environment and the second environment are satisfied at least one of a temperature-dependent relation and a humidity-dependent relation: a temperature of the first environment is Ta, a temperature of the second environment is Tb, and the temperature-dependent relation is satisfied: $6K \leq |Ta-Tb| \leq 148K$; and a relative humidity of the first environment is RHa, a relative humidity of the second environment is RHb, and the humidity-dependent relation is satisfied: $7\% \leq |RHa-RHb| \leq 89\%$.

The space adjusting structure can be formed via the first peripheral portion of the first lens element and the plate portion of the lens barrel, and the space adjusting structure includes a frustum surface, a spatial frustum surface, a corresponding structure and a spatial layer. The frustum surface is disposed on the object-side surface of the first peripheral portion and disposed around the optical axis, and an object-side end of the frustum surface is closer to the optical axis than an image-side end of the frustum surface to the optical axis. The spatial frustum surface is disposed on the object-side surface of the first peripheral portion and disposed around the optical axis, and an object-side end of the spatial frustum surface is farther from the optical axis than an image-side end of the spatial frustum surface from the optical axis. The corresponding structure is disposed on the image-side surface of the plate portion and correspondingly disposed on the frustum surface and the spatial frustum surface. The spatial layer is formed between the spatial frustum surface and the corresponding structure, so that the spatial frustum surface and the corresponding structure are disposed at intervals. When the imaging lens assembly is in a first environment, the frustum surface and the corresponding structure can be directly contacted, and a minimum spacing distance between the spatial frustum surface and the corresponding structure is G; when the imaging lens assembly is in a second environment, the frustum surface and the corresponding structure can be disposed at intervals, and the minimum spacing distance between the spatial frustum surface and the corresponding structure is G'; on a cross section along the optical axis, and an angle between the frustum surface and the spatial frustum surface is δ, the following conditions can be satisfied: $0\ \mu m \leq G' < G \leq 37\ \mu m$; and $18\ \text{degrees} \leq \delta \leq 130\ \text{degrees}$.

The expansion rate between the optical elements is different due to the environmental variety, and the cushion space between the optical elements can be provided by changing the dimension of the spatial layers. Moreover, the interference between the optical elements after the variety of the environmental condition can be reduced via the structural design of the aforementioned space adjusting structures, so as to avoid the stress generated owing to the interference to lead the deformation of the optical lens elements. In other words, the deformation of the lens elements generated owing to the stress can be avoided, so as to maintain the stability of the optical quality, wherein the variety of the environmental condition can be the variety of temperature or the variety of humidity. When the expansion rate of the first lens element about the environmental variety is smaller than the expansion rate of the lens barrel about the environmental variety, the interference owing to the expansion can be avoided via the aforementioned structure.

Moreover, the assembling positioning between the lens barrel and the first lens element can be enhanced under the first environment by the direct contact between the frustum surface and the corresponding structure; the interference between the frustum surface and the corresponding structure can be avoided under the second environment by the frustum surface and the corresponding structure disposed at intervals to form the spatial layer.

Further, a number of the space adjusting structure can be two, wherein one of the space adjusting structures is formed via the first peripheral portion of the first lens element and the plate portion of the lens barrel, and the other one of the space adjusting structures is formed via the first peripheral portion of the first lens element and the second peripheral portion of the second lens element.

The other one of the space adjusting structures includes a frustum surface, a spatial frustum surface, a corresponding structure and a spatial layer. The frustum surface is disposed on the object-side surface of the second peripheral portion and disposed around the optical axis, and an object-side end of the frustum surface is farther from the optical axis than an image-side end of the frustum surface from the optical axis. The spatial frustum surface is disposed on the object-side surface of the second peripheral portion and disposed around the optical axis, and an object-side end of the spatial frustum surface is closer to the optical axis than an image-side end of the spatial frustum surface to the optical axis. The corresponding structure is disposed on the image-side surface of the first peripheral portion and correspondingly disposed on the frustum surface and the spatial frustum surface. The spatial layer is formed between the spatial frustum surface and the corresponding structure, so that the spatial frustum surface and the corresponding structure are disposed at intervals.

When the imaging lens assembly is in a first environment, the frustum surface and the corresponding structure of the one of the space adjusting structures can be directly contacted, the frustum surface and the corresponding structure of the other one of the space adjusting structures can be directly contacted, a minimum spacing distance between the spatial frustum surface and the corresponding structure of the one of the space adjusting structures is G$\alpha$, a minimum spacing distance between the spatial frustum surface and the corresponding structure of the other one of the space adjusting structures is G$\beta$; when the imaging lens assembly is in a second environment, the frustum surface and the corresponding structure of the one of the space adjusting structures can be disposed at intervals, the frustum surface and the corresponding structure of the other one of the space adjusting structures can be disposed at intervals, the minimum spacing distance between the spatial frustum surface and the corresponding structure of the one of the space adjusting structures is G$\alpha$', the minimum spacing distance between the spatial frustum surface and the corresponding structure of the other one of the space adjusting structures is G$\beta$'; on a cross section along the optical axis, an angle between the frustum surface and the spatial frustum surface of the one of the space adjusting structures is $\theta\alpha$, and an angle between the frustum surface and the spatial frustum surface of the other one of the space adjusting structures is $\theta\beta$, the following conditions can be satisfied: 0 µm≤G$\alpha$'<G$\alpha$≤37 µm; 0 µm≤G$\beta$'<G$\beta$≤38 µm; 18 degrees≤$\theta\alpha$≤130 degrees; and 18 degrees≤$\theta\beta$≤130 degrees.

When the expansion rate of the first lens element about the environmental variety is smaller than the expansion rate of the lens barrel about the environmental variety and the expansion rate of the second lens element about the environmental variety, so as to obtain the better effect of avoiding interference via the aforementioned structure, the interference owing to the expansion can be avoided, and the assembling stability can be maintained.

When $\theta\alpha$ satisfies the aforementioned condition, the stressed direction which the first lens element and the corresponding structure of the one of the space adjusting structures are directly contacted can be dispersed, so as to avoid the deformation of the first lens element owing to stressed.

When $\theta\beta$ satisfies the aforementioned condition, the stressed direction which the second lens element and the corresponding structure of the other one of the space adjusting structures are directly contacted can be dispersed, so as to avoid the deformation of the second lens element owing to stressed.

Furthermore, the assembling positioning between the lens barrel and the first lens element can be enhanced under the first environment by the direct contact between the frustum surface and the corresponding structure of the one of the space adjusting structures; by the disposition at intervals of the frustum surface and the corresponding structure of the one of the space adjusting structures, the spatial layer can be formed between the frustum surface and the corresponding structure of the one of the space adjusting structures under the second environment to avoid the interference; the assembling positioning between the first lens element and the second lens element can be enhanced under the first environment by the direct contact between the frustum surface and the corresponding structure of the other one of the space adjusting structures; by the disposition at intervals of the frustum surface and the corresponding structure of the other one of the space adjusting structures, the spatial layer can be formed between the frustum surface and the corresponding structure of the other one of the space adjusting structures under the second environment to avoid the interference.

The imaging lens assembly can further include a third lens element, wherein the third lens element is disposed on an image side of the second lens element. The third lens element includes a third optical effective portion and a third peripheral portion, wherein the optical axis passes through the third optical effective portion, the third peripheral portion is disposed around the third optical effective portion, and an object-side surface of the third peripheral portion is directly contacted with an image-side surface of the second peripheral portion.

Or, a number of the space adjusting structure can be two, wherein the one of the space adjusting structures is formed via the first peripheral portion of the first lens element and the second peripheral portion of the second lens element, and the other one of the space adjusting structures is formed via the second peripheral portion of the second lens element and the third peripheral portion of the third lens element.

The one of the space adjusting structures includes a frustum surface, a spatial frustum surface, a corresponding structure and a spatial layer. The frustum surface is disposed on the object-side surface of the second peripheral portion and disposed around the optical axis, and an object-side end of the frustum surface is farther from the optical axis than an image-side end of the frustum surface from the optical axis. The spatial frustum surface is disposed on the object-side surface of the second peripheral portion and disposed around the optical axis, and an object-side end of the spatial frustum surface is closer to the optical axis than an image-side end of the spatial frustum surface to the optical axis. The corresponding structure is disposed on the image-side surface of the first peripheral portion and correspondingly disposed on the frustum surface and the spatial frustum surface. The spatial layer is formed between the spatial frustum surface and the corresponding structure, so that the spatial frustum surface and the corresponding structure are disposed at intervals.

The other one of the space adjusting structures includes a frustum surface and a corresponding structure. The frustum surface is disposed on the object-side surface of the third peripheral portion and disposed around the optical axis, and an object-side end of the frustum surface is closer to the optical axis than an image-side end of the frustum surface to the optical axis. The corresponding structure is disposed on the image-side surface of the second peripheral portion and correspondingly disposed on the frustum surface.

When the imaging lens assembly is in the first environment, the frustum surface and the corresponding structure of the one of the space adjusting structures can be directly contacted, and a minimum spacing distance between the spatial frustum surface and the corresponding structure of the one of the space adjusting structures is Gγ; when the imaging lens assembly is in the second environment, the frustum surface and the corresponding structure of the one of the space adjusting structures can be disposed at intervals, and the minimum spacing distance between the spatial frustum surface and the corresponding structure of the one of the space adjusting structures is Gγ'; on the cross section along the optical axis, an angle between the frustum surface and the spatial frustum surface of the one of the space adjusting structures is θγ, the following conditions can be satisfied: 3 μm≤Gγ'<Gγ≤38 μm; and 18 degrees≤θγ≤130 degrees.

When the expansion rate of the second lens element about the environmental variety is larger than the expansion rate of the first lens element about the environmental variety and the expansion rate of the third lens element about the environmental variety, the interference owing to the expansion can be avoided via the aforementioned structure.

The other one of the space adjusting structures can further include a spatial frustum surface and a spatial layer. The spatial frustum surface is disposed on the object-side surface of the third peripheral portion and disposed around the optical axis, an object-side end of the spatial frustum surface is farther from the optical axis than an image-side end of the spatial frustum surface from the optical axis, and the corresponding structure is further correspondingly disposed on the spatial frustum surface. The spatial layer is formed between the spatial frustum surface and the corresponding structure, so that the spatial frustum surface and the corresponding structure are disposed at intervals.

When the imaging lens assembly is in a first environment, the frustum surface and the corresponding structure of the other one of the space adjusting structures can be directly contacted, and a minimum spacing distance between the spatial frustum surface and the corresponding structure of the other one of the space adjusting structures is Gδ; when the imaging lens assembly is in a second environment, the frustum surface and the corresponding structure of the other one of the space adjusting structures can be disposed at intervals, and the minimum spacing distance between the spatial frustum surface and the corresponding structure of the other one of the space adjusting structures is Gδ'; on the cross section along the optical axis, an angle between the frustum surface and the spatial frustum surface of the other one of the space adjusting structures is θδ, the following conditions can be satisfied: 3 μm≤Gδ'<Gδ≤39 μm; and 18 degrees≤θδ≤130 degrees.

When an abbe number of the second lens element is Vd, the following condition can be satisfied: 8≤Vd≤29. When Vd satisfies the aforementioned condition, the volume of the second lens element is easily changed owing to the environmental variety. Further, the following condition can be satisfied: 8≤Vd≤22. Further, the following condition can be satisfied: 8≤Vd≤20.5.

The first peripheral portion can include a bearing surface vertical to the optical axis, and the bearing surface and the plate portion are directly contacted. Therefore, the axial assembling stability of the first lens element can be promoted. Moreover, the directly contact of the bearing surface can be maintained under the first environment and the second environment.

The second peripheral portion can include a bearing surface vertical to the optical axis, and the bearing surface and the first peripheral portion are directly contacted. Therefore, the axial assembling stability of the second lens element can be promoted.

A diameter of the first lens element can be smaller than a diameter of the second lens element, and the diameter of the second lens element can be smaller than a diameter of the third lens element. Therefore, the aforementioned structure can be favorable for the optical design of the imaging lens assembly.

Each of the aforementioned features of the imaging lens assembly can be utilized in various combinations for achieving the corresponding effects.

The present disclosure provides an electronic device, which includes the aforementioned imaging lens assembly.

According to the aforementioned embodiment, specific embodiments and examples are provided, and illustrated via figures.

1st Embodiment

Figure 1B:
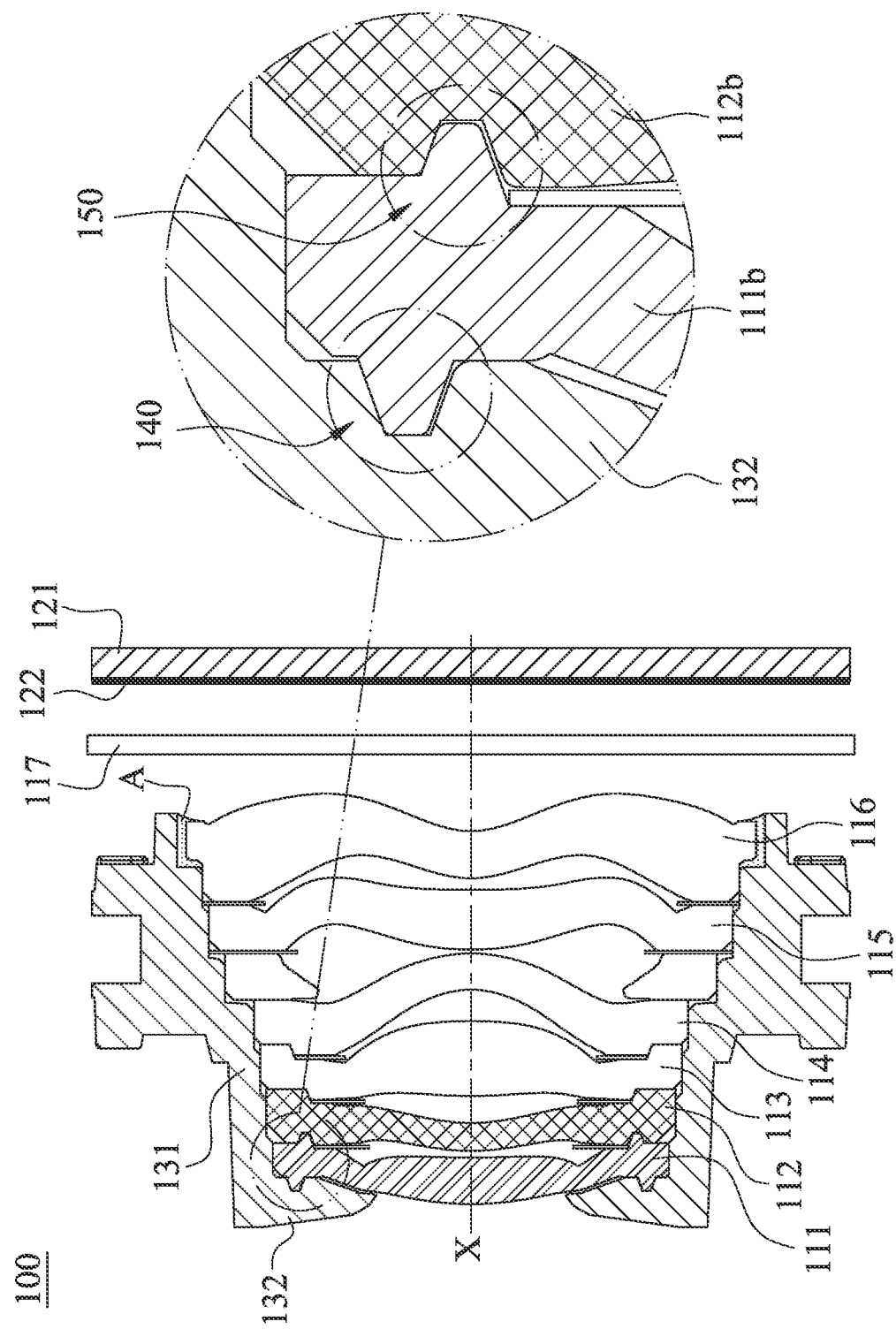
FIG. 1B is a schematic view of the imaging lens assembly according to the 1st embodiment in FIG. 1A.

FIG. 1A is a partial cross-sectional view of an imaging lens assembly 100 according to the 1st embodiment of the present disclosure. FIG. 1B is a schematic view of the imaging lens assembly 100 according to the 1st embodiment in FIG. 1A. In FIGS. 1A and 1B, the imaging lens assembly 100 includes a plurality of lens elements 111, 112, 113, 114, 115, 116, an optical filter 117, an image sensor 121, a lens barrel 130 (labelled in FIG. 1G) and two space adjusting structures 140, 150, wherein an optical axis X passes through the imaging lens assembly 100, and the image sensor 121 is disposed on an image surface 122.

According to the 1st embodiment, the lens element 111 can be a first lens element, and the lens element 112 can be a second lens element. The first lens element includes a first optical effective portion 111a (labelled in FIG. 1G) and a first peripheral portion 111b, wherein the optical axis X passes through the first optical effective portion 111a, and the first peripheral portion 111b is disposed around the first optical effective portion 111a. The second lens element is disposed on an image side of the first lens element, and includes a second optical effective portion 112a (labelled in FIG. 1H) and a second peripheral portion 112b, wherein the optical axis X passes through the second optical effective portion 112a, the second peripheral portion 112b is disposed around the second optical effective portion 112a, and an object-side surface of the second peripheral portion 112b is directly contacted with an image-side surface of the first peripheral portion 111b.

The lens barrel 130 includes a cylindrical portion 131 and a plate portion 132, wherein the cylindrical portion 131 surrounds the optical axis X with the optical axis X as an axis, the plate portion 132 is connected to the cylindrical portion 131 and extends towards a direction close to the optical axis X to form a light through hole 133, and an accommodating space 134 (labelled in FIG. 1G) is formed via the cylindrical portion 131 and the plate portion 132. Moreover, the lens elements 111, 112, 113, 114, 115, 116 are disposed in the accommodating space 134, and an image-side surface of the plate portion 132 is directly contacted with an object-side surface of the first peripheral portion 111b, wherein the lens element 116 is fixed on the cylindrical portion 131 via a glue A.

Figure 1D:
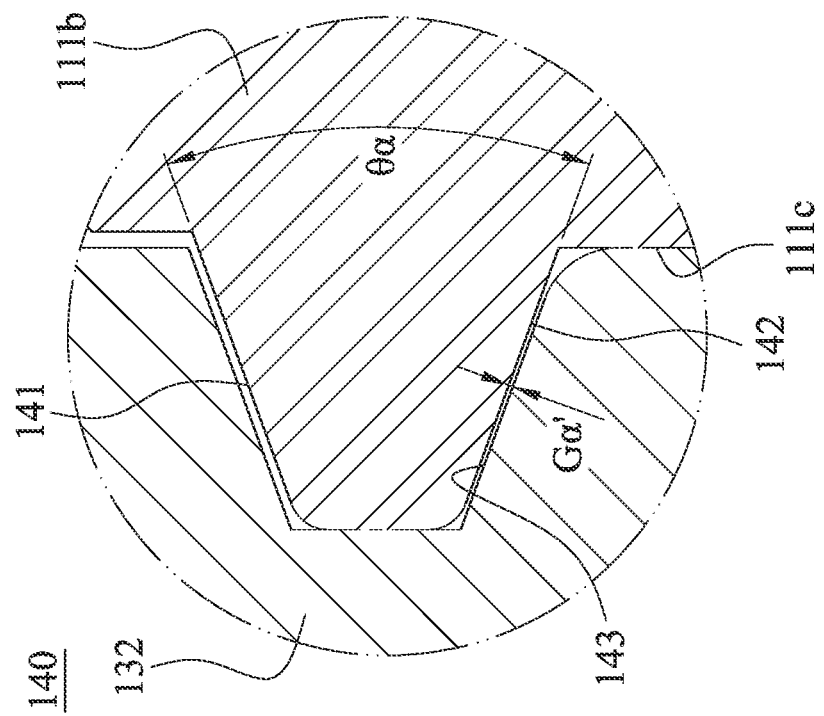
FIG. 1D is a schematic view of the space adjusting structure under the second environment according to the 1st embodiment in FIG. 1B.
Figure 1C:
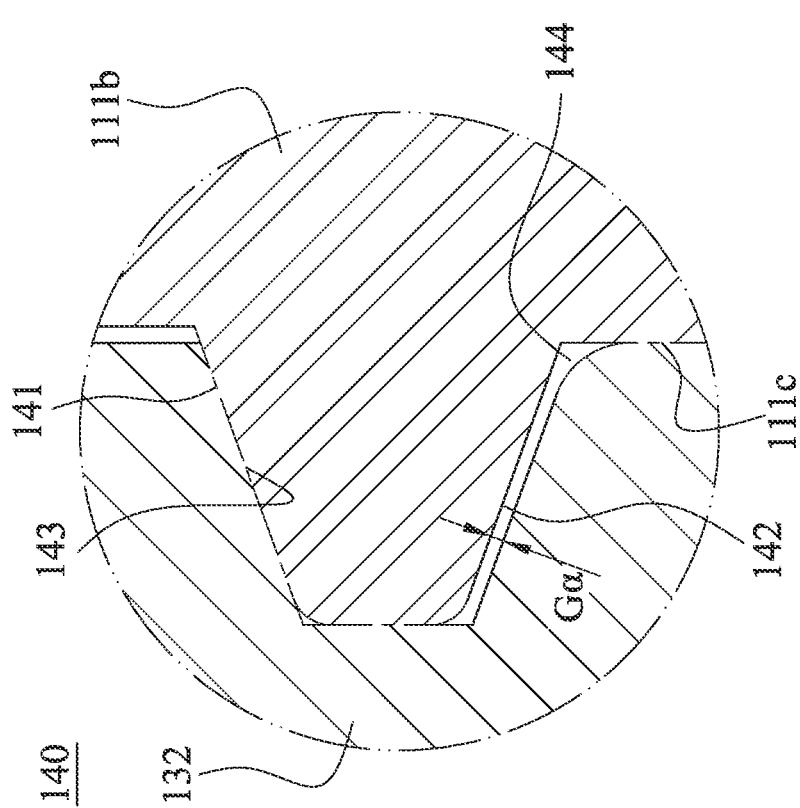
FIG. 1C is a schematic view of the space adjusting structure under the first environment according to the 1st embodiment in FIG. 1B.
Figure 1F:
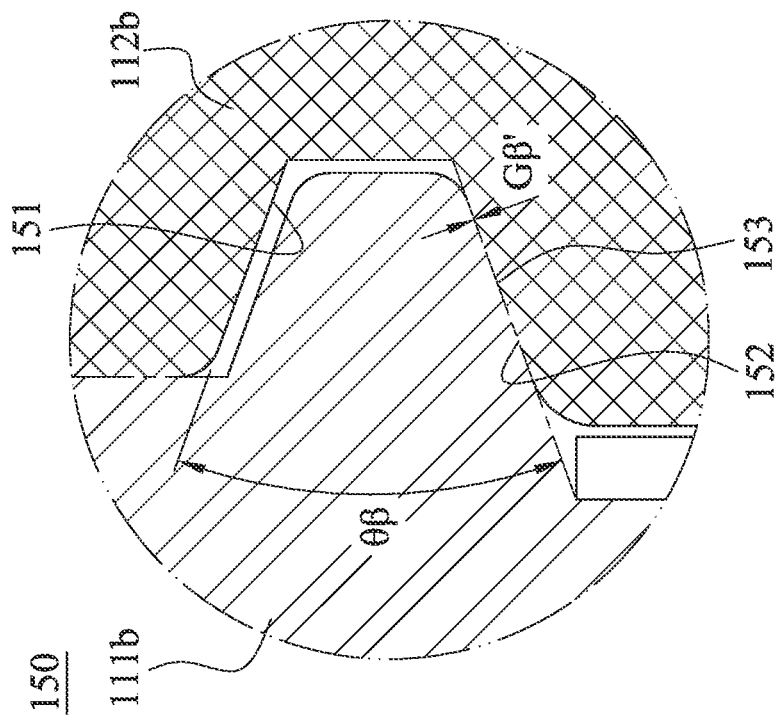
FIG. 1F is a schematic view of the space adjusting structure under the second environment according to the 1st embodiment in FIG. 1B.
Figure 1E:
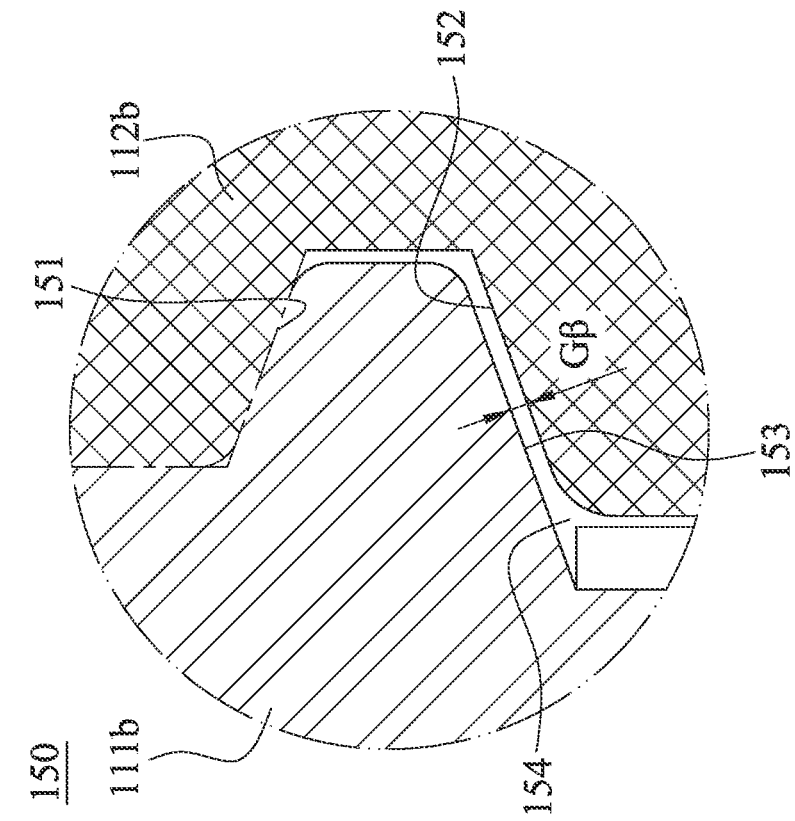
FIG. 1E is a schematic view of the space adjusting structure under the first environment according to the 1st embodiment in FIG. 1B.
Figure 1G:
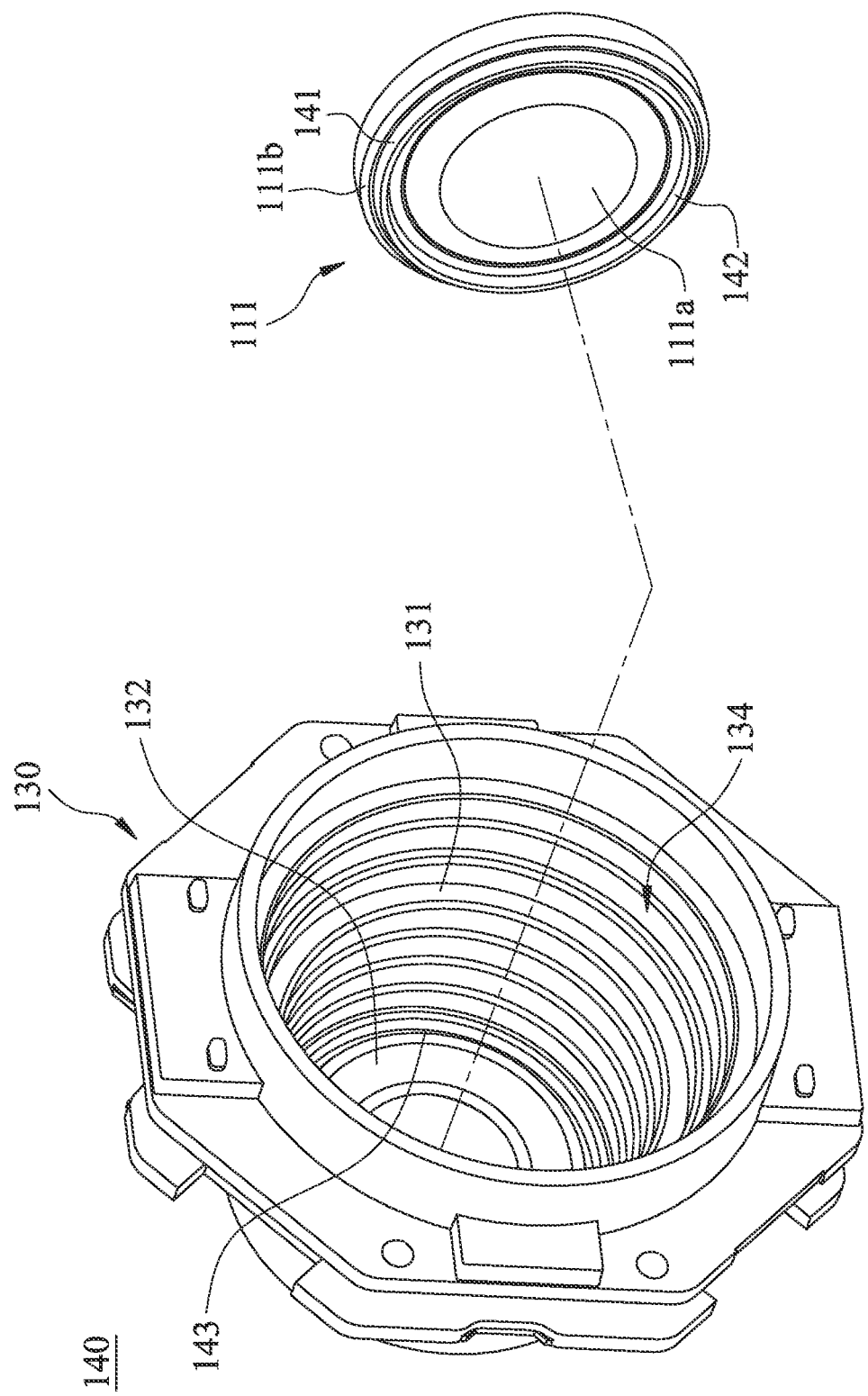
FIG. 1G is an exploded view of the lens barrel and the lens element according to the 1st embodiment in FIG. 1A.
Figure 1H:
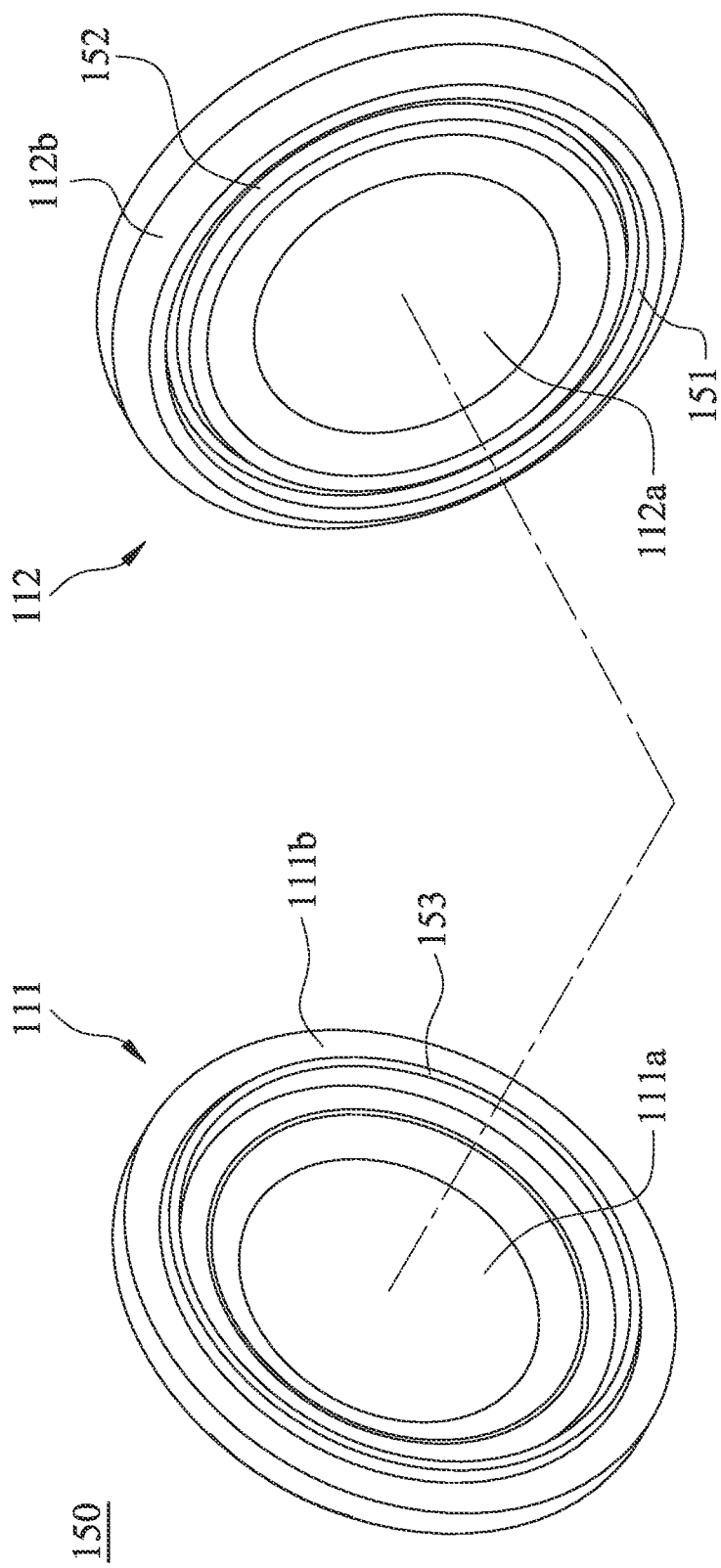
FIG. 1H is an exploded view of the lens elements according to the 1st embodiment in FIG. 1A.

FIG. 1C is a schematic view of the space adjusting structure 140 under the first environment according to the 1st embodiment in FIG. 1B. FIG. 1D is a schematic view of the space adjusting structure 140 under the second environment according to the 1st embodiment in FIG. 1B. FIG. 1E is a schematic view of the space adjusting structure 150 under the first environment according to the 1st embodiment in FIG. 1B. FIG. 1F is a schematic view of the space adjusting structure 150 under the second environment according to the 1st embodiment in FIG. 1B. FIG. 1G is an exploded view of the lens barrel 130 and the lens element 111 according to the 1st embodiment in FIG. 1A. FIG. 1H is an exploded view of the lens elements 111, 112 according to the 1st embodiment in FIG. 1A. In FIGS. 1C to 1H, the space adjusting structure 140 is formed via the first peripheral portion 111b of the first lens element (that is, the lens element 111) and the plate portion 132 of the lens barrel 130, the space adjusting structure 150 is formed via the first peripheral portion 111b of the first lens element and the second peripheral portion 112b of the second lens element (that is, the lens element 112).

In FIGS. 1C, 1D and 1G, the space adjusting structure 140 includes a frustum surface 141, a spatial frustum surface 142, a corresponding structure 143 and a spatial layer 144. The frustum surface 141 is disposed on the object-side surface of the first peripheral portion 111b and disposed around the optical axis X, and an object-side end of the frustum surface 141 is closer to the optical axis X than an image-side end of the frustum surface 141 to the optical axis X. The spatial frustum surface 142 is disposed on the object-side surface of the first peripheral portion 111b and disposed around the optical axis X, and an object-side end of the spatial frustum surface 142 is farther from the optical axis X than an image-side end of the spatial frustum surface 142 from the optical axis X. The corresponding structure 143 is disposed on the image-side surface of the plate portion 132 and correspondingly disposed on the frustum surface 141 and the spatial frustum surface 142. The spatial layer 144 is formed between the spatial frustum surface 142 and the corresponding structure 143, so that the spatial frustum surface 142 and the corresponding structure 143 are disposed at intervals.

In FIGS. 1E, 1F and 1H, the space adjusting structure 150 includes a frustum surface 151, a spatial frustum surface 152, a corresponding structure 153 and a spatial layer 154. The frustum surface 151 is disposed on the object-side surface of the second peripheral portion 112b and disposed around the optical axis X, and an object-side end of the frustum surface 151 is farther from the optical axis X than an image-side end of the frustum surface 151 from the optical axis X. The spatial frustum surface 152 is disposed on the object-side surface of the second peripheral portion 112b and disposed around the optical axis X, and an object-side end of the spatial frustum surface 152 is closer to the optical axis X than an image-side end of the spatial frustum surface 152 to the optical axis X. The corresponding structure 153 is disposed on the image-side surface of the first peripheral portion 111b and correspondingly disposed on the frustum surface 151 and the spatial frustum surface 152. The spatial layer 154 is formed between the spatial frustum surface 152 and the corresponding structure 153, so that the spatial frustum surface 152 and the corresponding structure 153 are disposed at intervals.

In particular, the expansion rate between the optical elements is different due to the environmental variety, and the cushion space between the optical elements can be provided by changing the dimension of the spatial layers 144, 154, wherein the variety of the environmental condition can be the variety of temperature or the variety of humidity. Further, the interference between the optical elements after the variety of the environmental condition can be reduced via the structural design of the space adjusting structures 140, 150, so as to avoid the stress generated owing to the interference to lead the deformation of the optical lens elements. Therefore, the deformation of the lens elements generated owing to the stress can be avoided, so as to maintain the stability of the optical quality. Moreover, the expansion rate of the first lens element (that is, the lens element 111) about the environmental variety is smaller than the expansion rate of the lens barrel 130 about the environmental variety and the expansion rate of the second lens element (that is, the lens element 112) about the environmental variety, so as to obtain the better effect of avoiding interference via the aforementioned structure, the interference owing to the expansion can be avoided, and the stability of the optical quality can be maintained.

In FIG. 1D, the first peripheral portion 111b includes a bearing surface 111c vertical to the optical axis X, and the bearing surface 111c and the plate portion 132 are directly contacted. Therefore, the axial assembling stability of the first lens element can be promoted.

Figure 1I:
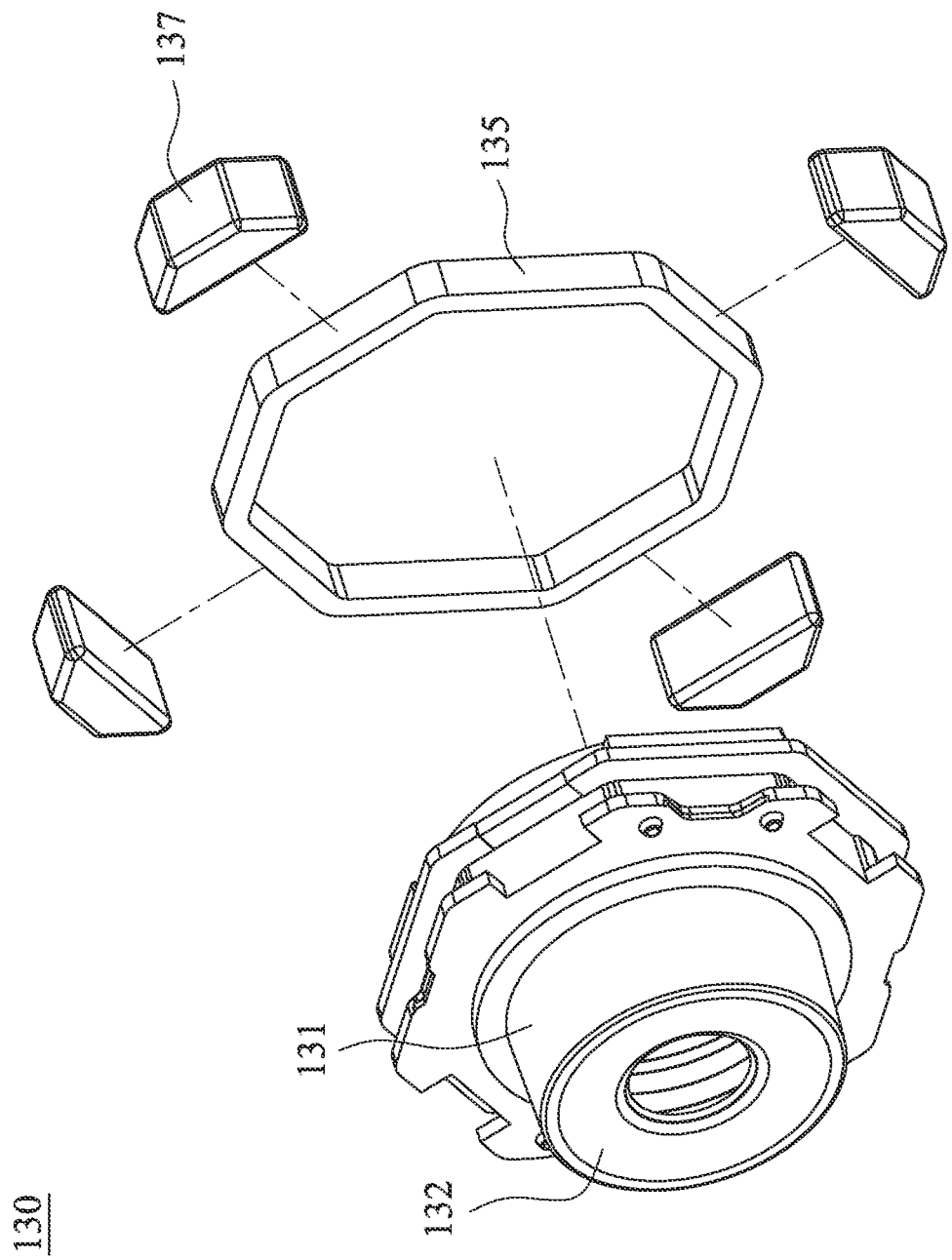
FIG. 1I is a partial exploded view of the lens barrel according to the 1st embodiment in FIG. 1A.

FIG. 1I is a partial exploded view of the lens barrel 130 according to the 1st embodiment in FIG. 1A. In FIGS. 1A and 1I, the lens barrel 130 further includes a coil 135, an elastic element 136 and a plurality of magnetic elements 137, wherein the coil 135 and the magnetic elements 137 are correspondingly disposed, and the elastic element 136 is disposed between the cylindrical portion 131 and the optical filter 117.

In FIGS. 1C and 1D, a temperature Ta of the first environment is 293.1 K, a relative humidity RHa of the first environment is 30%, a temperature Tb of the second environment is 303.1K, and a relative humidity RHb of the second environment is 50%, wherein when the imaging lens assembly 100 is in the first environment, the frustum surface 141 and the corresponding structure 143 are directly contacted; when the imaging lens assembly 100 is in the second environment, the frustum surface 141 and the corresponding structure 143 are disposed at intervals. In particular, the assembling positioning between the lens barrel 130 and the first lens element (that is, the lens element 111) can be enhanced under the first environment; the spatial layer 144 can be also formed between the frustum surface 141 and the corresponding structure 143, so as to avoid the interference under the second environment. Moreover, the directly contact of the bearing surface 111c can be maintained under the first environment and the second environment. In other words, when the corresponding structure 143 and the frustum surface 141 are disposed at intervals and the corresponding structure 143 and the spatial frustum surface 142 are disposed at intervals, the positioning of the first lens element is maintained by clamping the bearing surface 111c.

In FIGS. 1E and 1F, a temperature Ta of the first environment is 293.1 K, a relative humidity RHa of the first environment is 30%, a temperature Tb of the second environment is 293.1K, and a relative humidity RHb of the second environment is 85%, wherein when the imaging lens assembly 100 is in the first environment, the frustum surface 151 and the corresponding structure 153 are directly contacted; when the imaging lens assembly 100 is in the second environment, the frustum surface 151 and the corresponding structure 153 are disposed at intervals. In particular, the assembling positioning between the first lens element (that is, the lens element 111) and the second lens element (that is, the lens element 112) can be enhanced under the first environment; the spatial layer 154 can be also formed between the frustum surface 151 and the corresponding structure 153, so as to avoid the interference under the second environment.

It should be mentioned that the line segments of chain line in FIGS. 1C to 1F are configured to indicate the portion of directly contact.

In FIGS. 1C to 1F, when the imaging lens assembly 100 is in the first environment, a minimum spacing distance between the spatial frustum surface 142 and the corresponding structure 143 of the one of the space adjusting structures (that is, the space adjusting structure 140) is Gα, a minimum spacing distance between the spatial frustum surface 152 and the corresponding structure 153 of the other one of the space adjusting structures (that is, the space adjusting structure 150) is Gβ; when the imaging lens assembly 100 is in the second environment, the minimum spacing distance between the spatial frustum surface 142 and the corresponding structure 143 of the one of the space adjusting structures is Gα', the minimum spacing distance between the spatial frustum surface 152 and the corresponding structure 153 of the other one of the space adjusting structures is Gβ'; on a cross section along the optical axis X, an angle between the frustum surface 141 and the spatial frustum surface 142 of the one of the space adjusting structures is θα, an angle between the frustum surface 151 and the spatial frustum surface 152 of the other one of the space adjusting structures is θβ, and an abbe number of the second lens element (that is, the lens element 112) is Vd, the following conditions of Table 1A are satisfied.

TABLE 1A

| | | | |
|---|---|---|---|
| Gα (μm) | 15 | θα (degree) | 40 |
| Gα' (μm) | 5 | θβ (degree) | 40 |
| Gβ (μm) | 6 | Vd | 23.5 |
| Gβ' (μm) | 0 | | |

2nd Embodiment

Figure 2A:
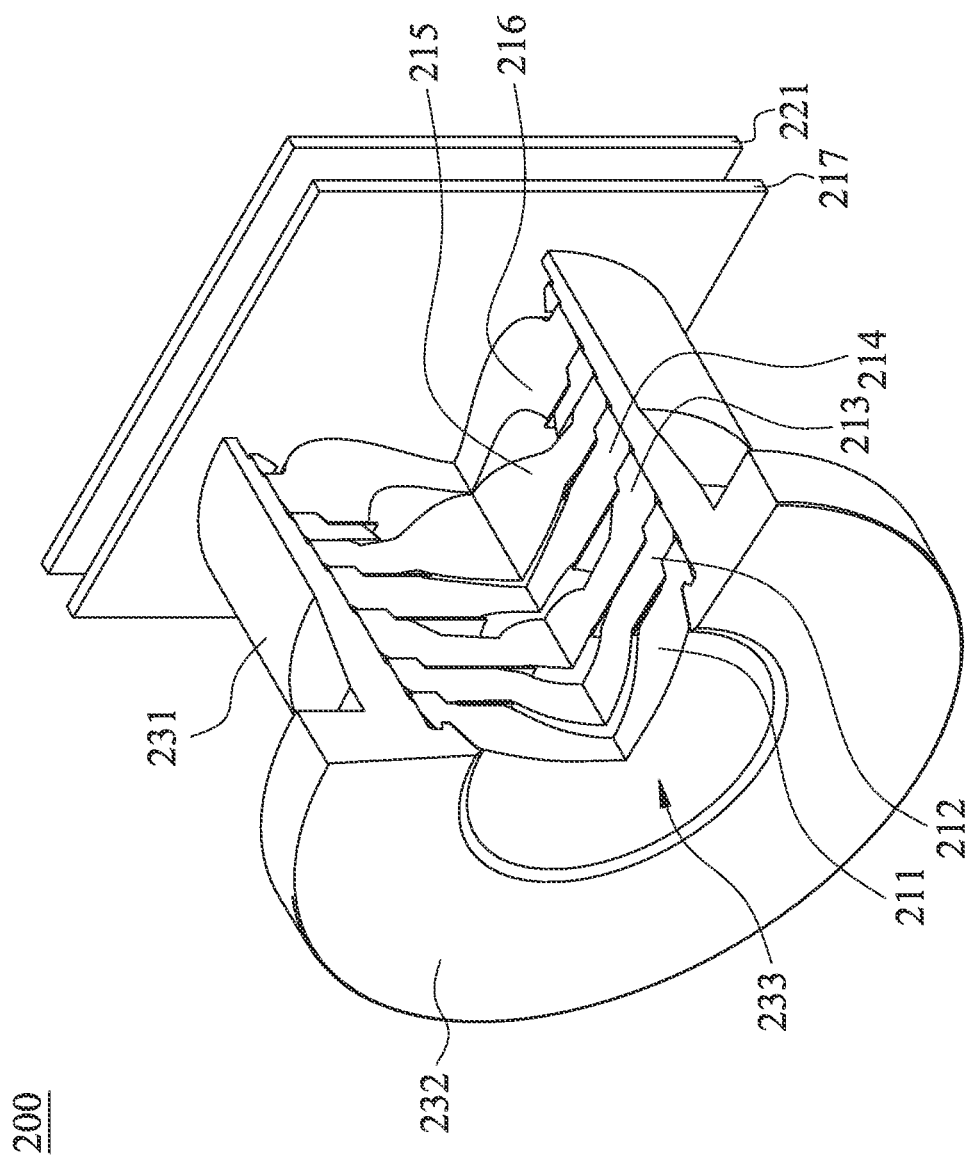
FIG. 2A is a partial cross-sectional view of an imaging lens assembly according to the 2nd embodiment of the present disclosure.
Figure 2B:
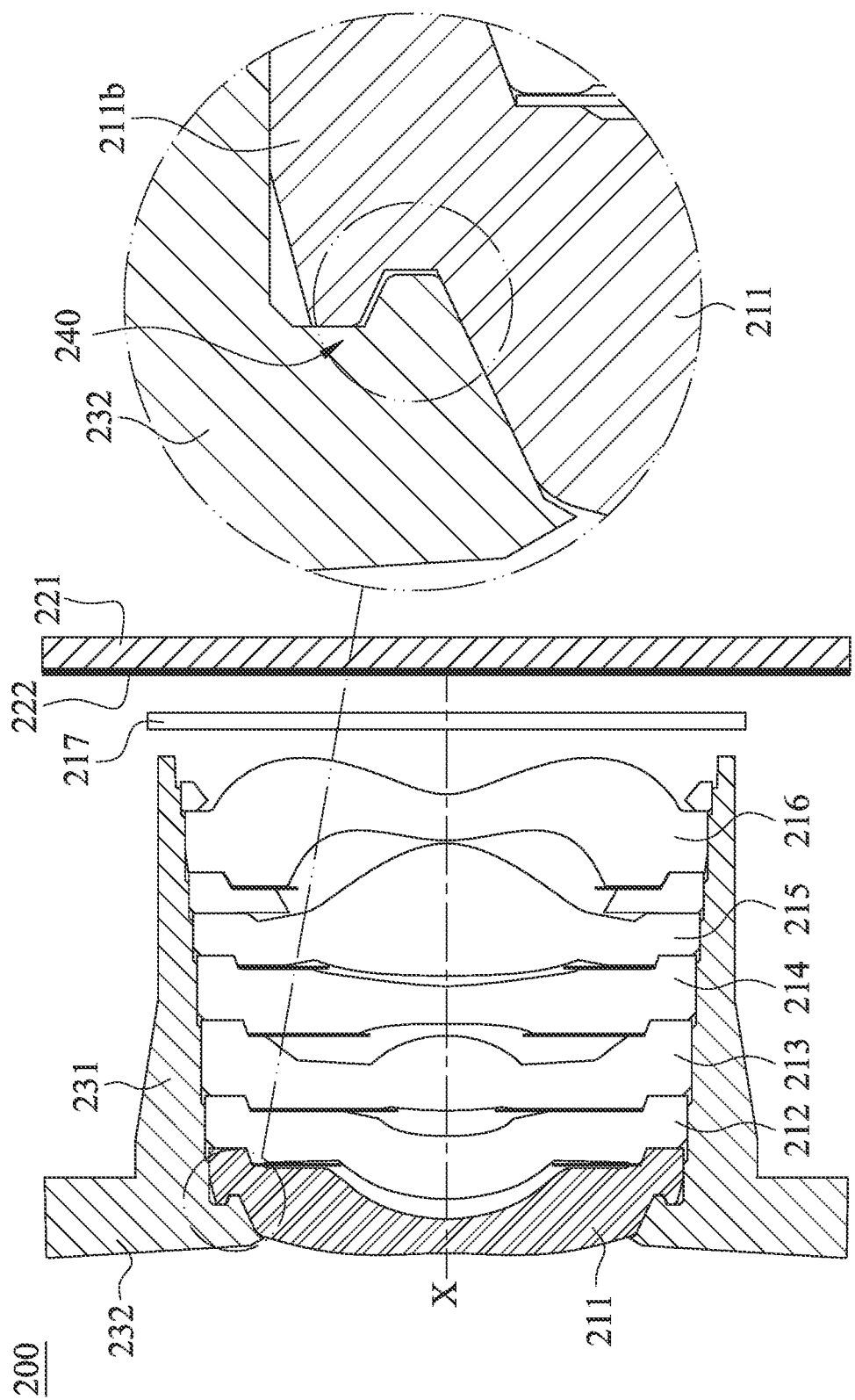
FIG. 2B is a schematic view of the imaging lens assembly according to the 2nd embodiment in FIG. 2A.

FIG. 2A is a partial cross-sectional view of an imaging lens assembly 200 according to the 2nd embodiment of the present disclosure. FIG. 2B is a schematic view of the imaging lens assembly 200 according to the 2nd embodiment in FIG. 2A. In FIGS. 2A and 2B, the imaging lens assembly 200 includes a plurality of lens elements 211, 212, 213, 214, 215, 216, an optical filter 217, an image sensor 221, a lens barrel 230 (labelled in FIG. 2E) and a space adjusting structure 240, wherein an optical axis X passes through the imaging lens assembly 200, and the image sensor 221 is disposed on an image surface 222.

According to the 2nd embodiment, the lens element 211 can be a first lens element. The first lens element includes a first optical effective portion 211a (labelled in FIG. 2E) and a first peripheral portion 211b, wherein the optical axis X passes through the first optical effective portion 211a, and the first peripheral portion 211b is disposed around the first optical effective portion 211a.

The lens barrel 230 includes a cylindrical portion 231 and a plate portion 232, wherein the cylindrical portion 231 surrounds the optical axis X with the optical axis X as an axis, the plate portion 232 is connected to the cylindrical portion 231 and extends towards a direction close to the optical axis X to form a light through hole 233, and an accommodating space 234 (labelled in FIG. 2E) is formed via the cylindrical portion 231 and the plate portion 232. Moreover, the lens elements 211, 212, 213, 214, 215, 216 are disposed in the accommodating space 234, and an image-side surface of the plate portion 232 is directly contacted with an object-side surface of the first peripheral portion 211b.

Figure 2D:
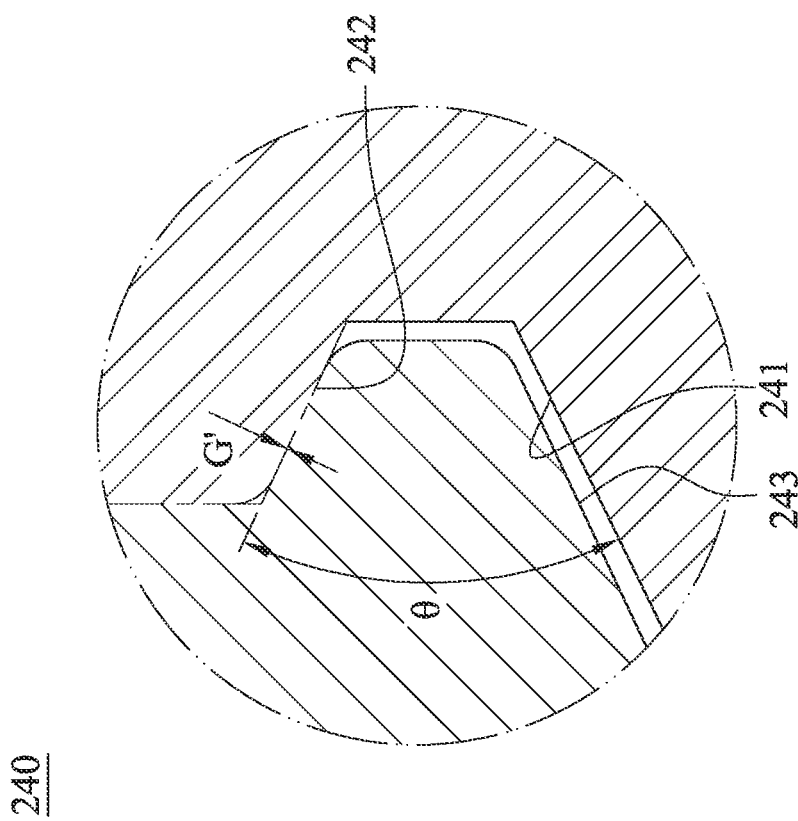
FIG. 2D is a schematic view of the space adjusting structure under the second environment according to the 2nd embodiment in FIG. 2B.
Figure 2C:
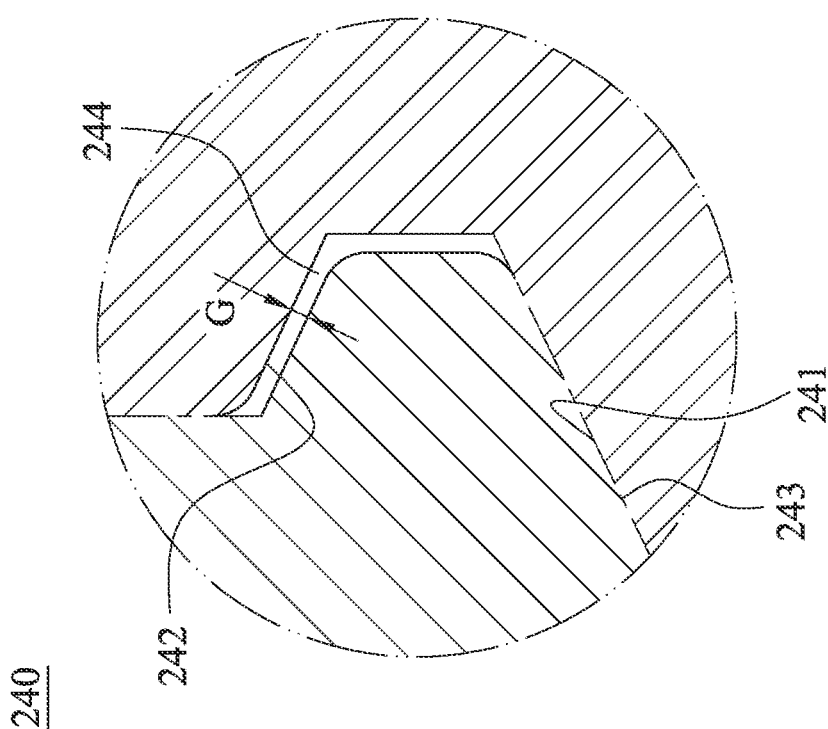
FIG. 2C is a schematic view of the space adjusting structure under the first environment according to the 2nd embodiment in FIG. 2B.
Figure 2E:
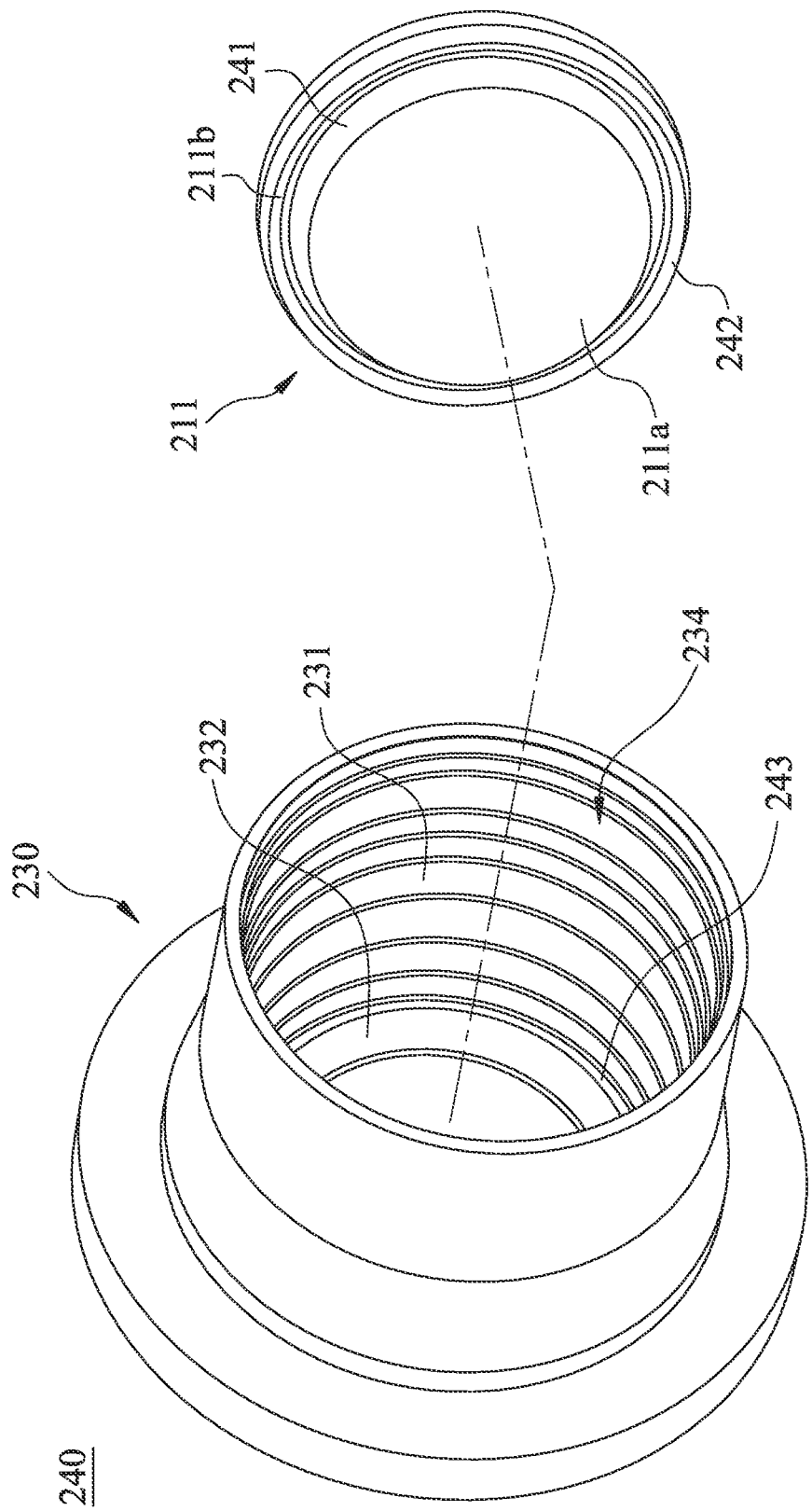
FIG. 2E is an exploded view of the lens barrel and the lens element according to the 2nd embodiment in FIG. 2A.

FIG. 2C is a schematic view of the space adjusting structure 240 under the first environment according to the 2nd embodiment in FIG. 2B. FIG. 2D is a schematic view of the space adjusting structure 240 under the second environment according to the 2nd embodiment in FIG. 2B. FIG. 2E is an exploded view of the lens barrel 230 and the lens element 211 according to the 2nd embodiment in FIG. 2A. In FIGS. 2C to 2E, the space adjusting structure 240 is formed via the first peripheral portion 211b of the first lens element (that is, the lens element 211) and the plate portion 232 of the lens barrel 230.

Furthermore, the space adjusting structure 240 includes a frustum surface 241, a spatial frustum surface 242, a corresponding structure 243 and a spatial layer 244. The frustum surface 241 is disposed on the object-side surface of the first peripheral portion 211b and disposed around the optical axis X, and an object-side end of the frustum surface 241 is closer to the optical axis X than an image-side end of the frustum surface 241 to the optical axis X. The spatial frustum surface 242 is disposed on the object-side surface of the first peripheral portion 211b and disposed around the optical axis X, and an object-side end of the spatial frustum surface 242 is farther from the optical axis X than an image-side end of the spatial frustum surface 242 from the optical axis X. The corresponding structure 243 is disposed on the image-side surface of the plate portion 232 and correspondingly disposed on the frustum surface 241 and the spatial frustum surface 242. The spatial layer 244 is formed between the spatial frustum surface 242 and the corresponding structure 243, so that the spatial frustum surface 242 and the corresponding structure 243 are disposed at intervals.

In particular, the interference between the optical elements after the variety of the environmental condition can be reduced via the structural design of the space adjusting structure 240. Therefore, the stress generated owing to the interference to lead the deformation of the optical lens elements can be avoided, and the stability of the optical quality can be further maintained, wherein the variety of the environmental condition can be the variety of temperature or the variety of humidity. Further, when the expansion rate of the first lens element (that is, the lens element 211) about the environmental variety is smaller than the expansion rate of the lens barrel 230 about the environmental variety, the interference owing to the expansion can be avoided via the aforementioned structure.

In FIGS. 2C and 2D, a temperature Ta of the first environment is 293.1 K, a relative humidity RHa of the first environment is 30%, a temperature Tb of the second environment is 358.1K, and a relative humidity RHb of the second environment is 85%, wherein when the imaging lens assembly 200 is in the first environment, the frustum surface 241 and the corresponding structure 243 are directly contacted; when the imaging lens assembly 200 is in the second environment, the frustum surface 241 and the corresponding structure 243 are disposed at intervals. In particular, the assembling positioning between the lens barrel 230 and the first lens element (that is, the lens element 211) can be enhanced under the first environment; the spatial layer 244 can be also formed between the frustum surface 241 and the corresponding structure 243, so as to avoid the interference under the second environment.

It should be mentioned that the line segments of chain line in FIGS. 2C and 2D are configured to indicate the portion of directly contact.

In FIGS. 2C and 2D, when the imaging lens assembly 200 is in the first environment, a minimum spacing distance between the spatial frustum surface 242 and the corresponding structure 243 is G; when the imaging lens assembly 200 is in the second environment, the minimum spacing distance between the spatial frustum surface 242 and the corresponding structure 243 is G'; on a cross section along the optical axis X, an angle between the frustum surface 241 and the spatial frustum surface 242 is θ, the following conditions of Table 2A are satisfied.

TABLE 2A

| G (μm) | 15 | θ (degree) | 50 |
|---|---|---|---|
| G' (μm) | 0 | | |

Further, all of other structures and dispositions according to the 2nd embodiment are the same as the structures and the dispositions according to the 1st embodiment, and will not be described again herein.

3rd Embodiment

Figure 3A:
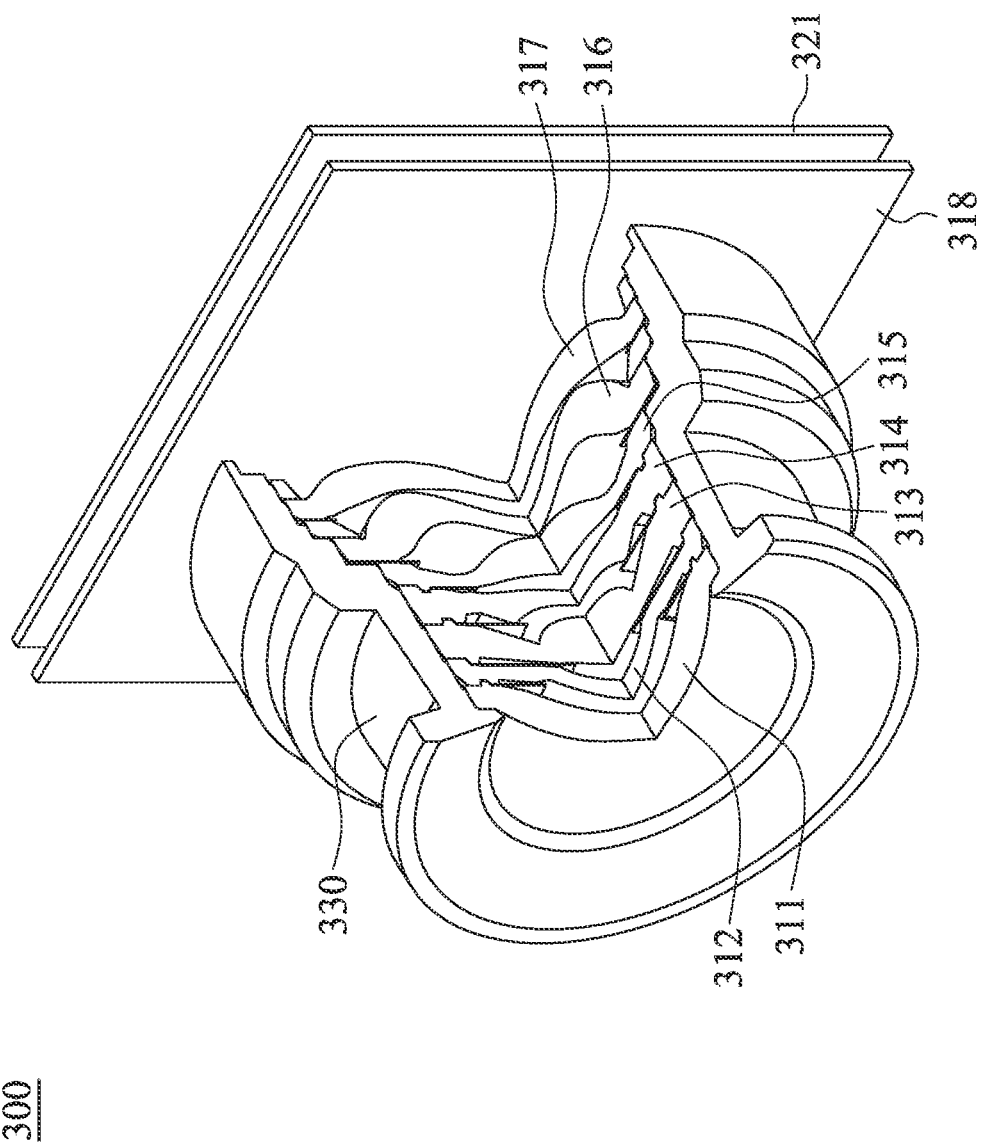
FIG. 3A is a partial cross-sectional view of an imaging lens assembly according to the 3rd embodiment of the present disclosure.
Figure 3B:
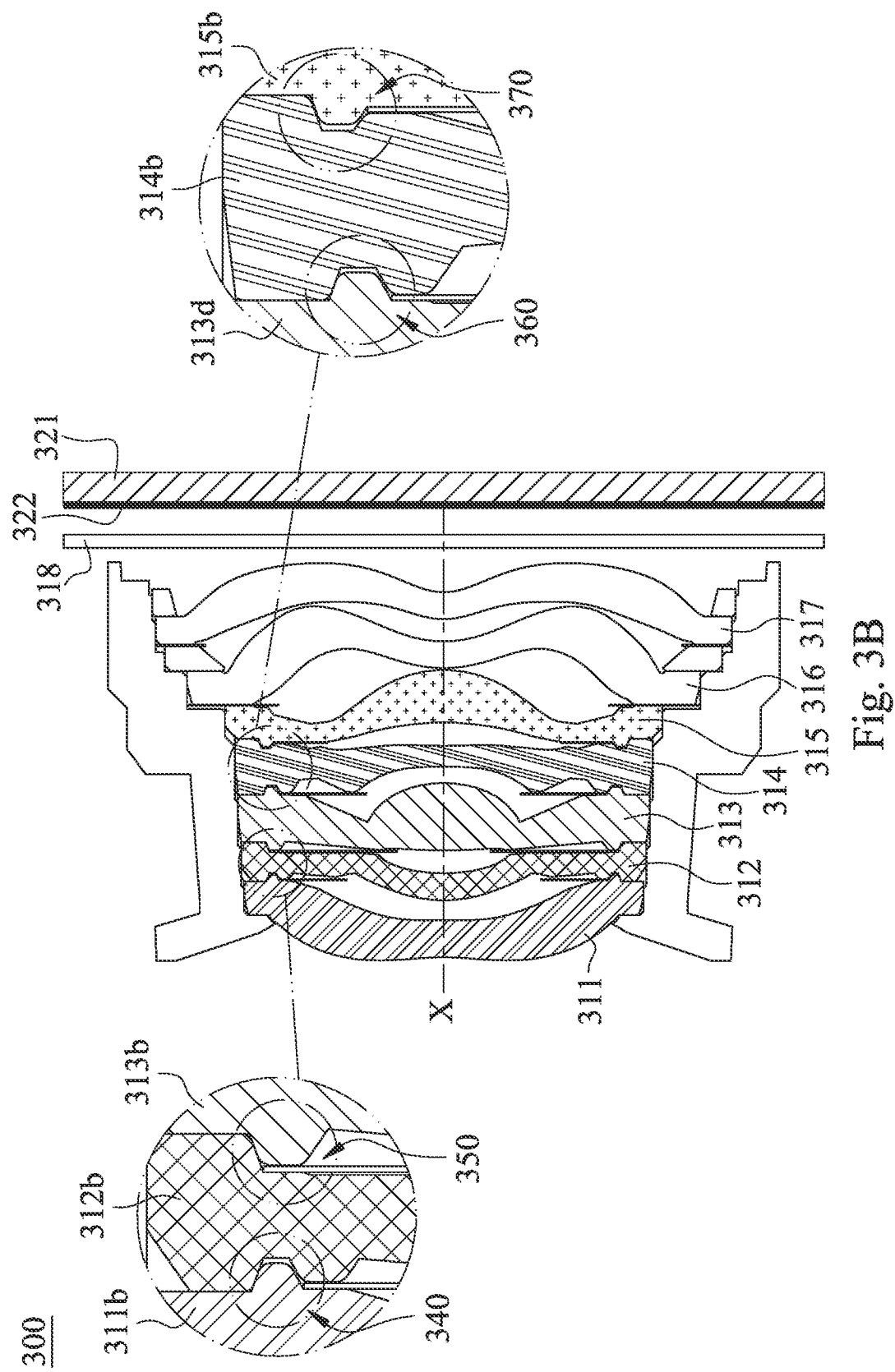
FIG. 3B is a schematic view of the imaging lens assembly according to the 3rd embodiment in FIG. 3A.

FIG. 3A is a partial cross-sectional view of an imaging lens assembly 300 according to the 3rd embodiment of the present disclosure. FIG. 3B is a schematic view of the imaging lens assembly 300 according to the 3rd embodiment in FIG. 3A. In FIGS. 3A and 3B, the imaging lens assembly 300 includes a plurality of lens elements 311, 312, 313, 314, 315, 316, 317, an optical filter 318, an image sensor 321, a lens barrel 330 and a plurality of space adjusting structures 340, 350, 360, 370, wherein an optical axis X passes through the imaging lens assembly 300, and the image sensor 321 is disposed on an image surface 322.

Figure 3D:
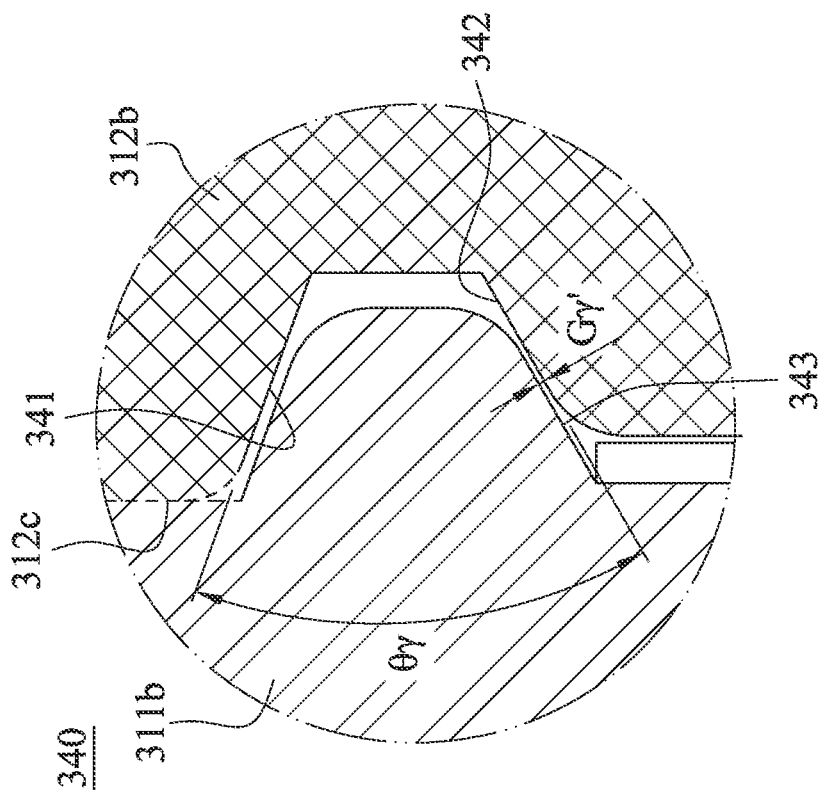
FIG. 3D is a schematic view of the space adjusting structure under the second environment according to the 1st example of the 3rd embodiment in FIG. 3B.
Figure 3C:
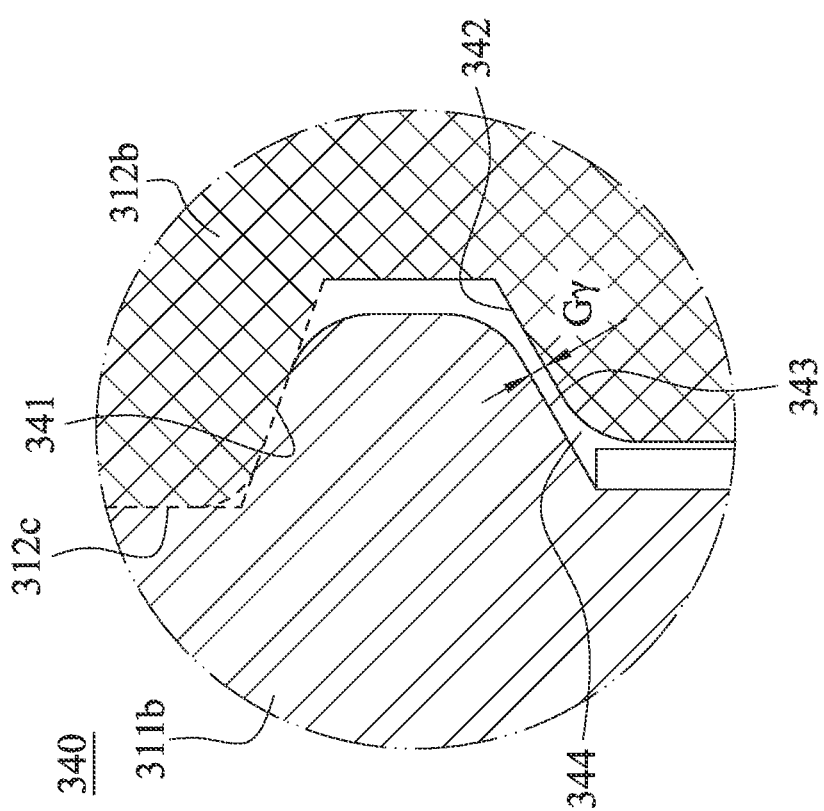
FIG. 3C is a schematic view of the space adjusting structure under the first environment according to the 1st example of the 3rd embodiment in FIG. 3B.
Figure 3F:
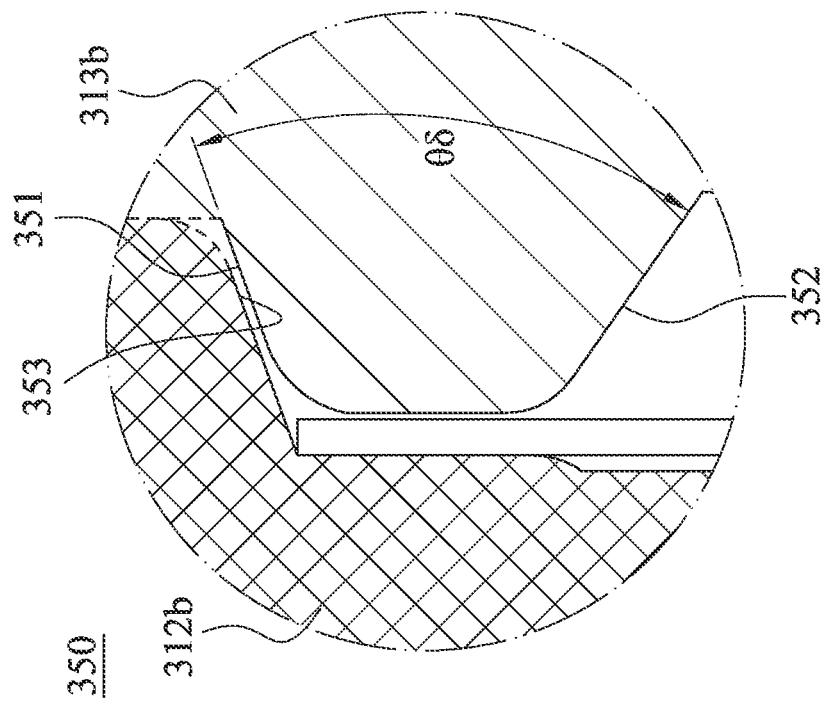
FIG. 3F is a schematic view of the space adjusting structure under the second environment according to the 1st example of the 3rd embodiment in FIG. 3B.
Figure 3E:
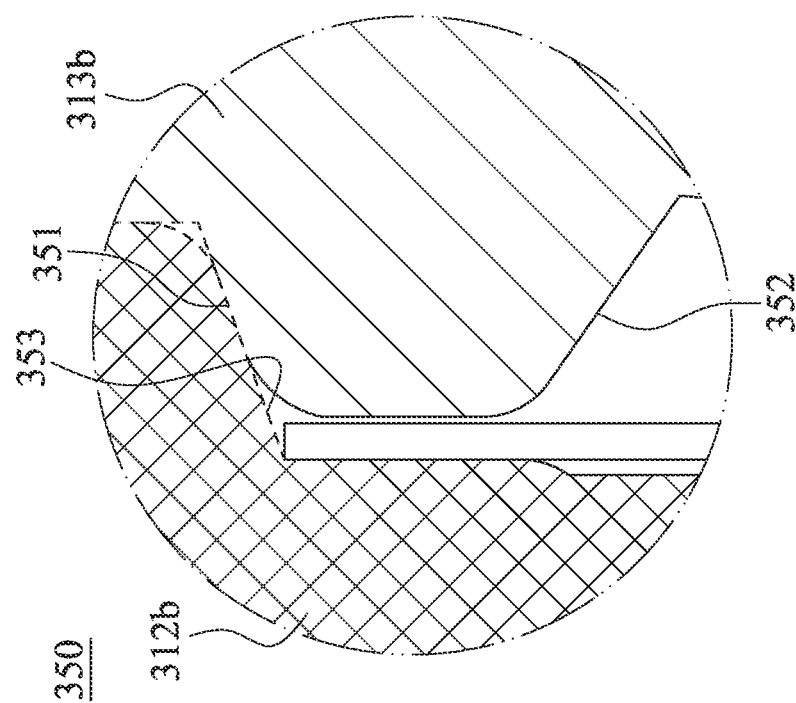
FIG. 3E is a schematic view of the space adjusting structure under the first environment according to the 1st example of the 3rd embodiment in FIG. 3B.
Figure 3G:
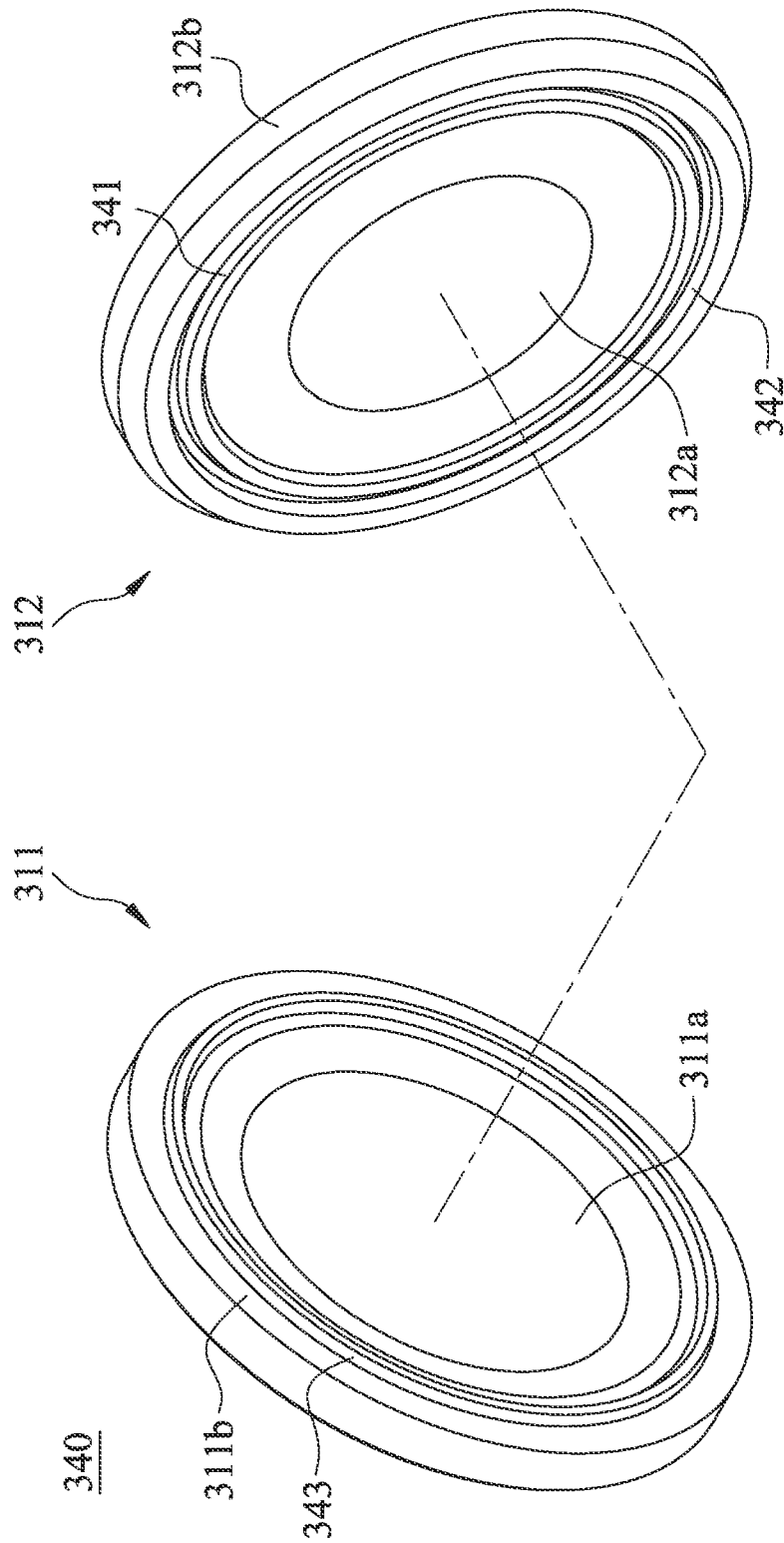
FIG. 3G is an exploded view of the lens elements according to the 1st example of the 3rd embodiment in FIG. 3A.
Figure 3H:
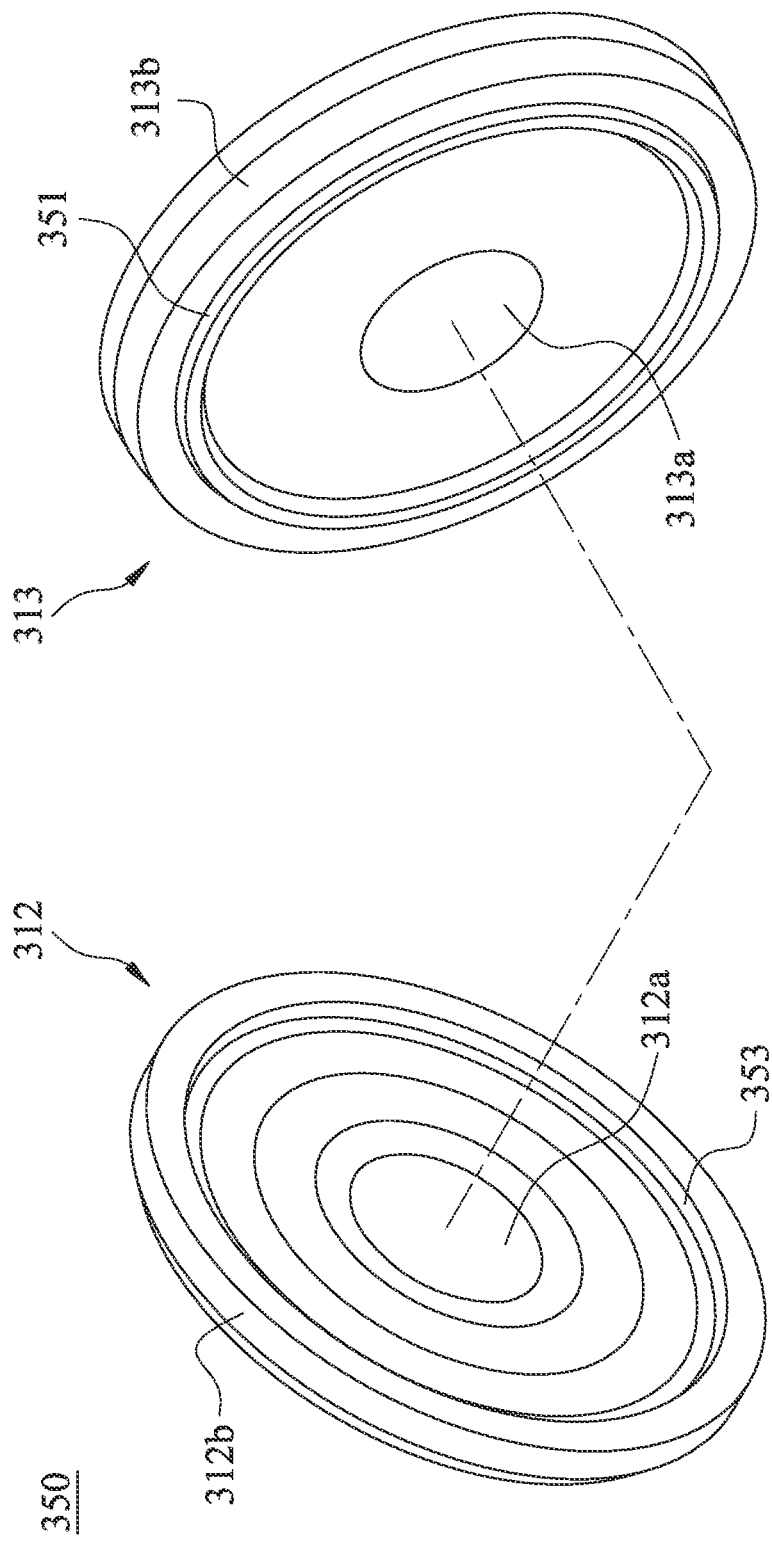
FIG. 3H is an exploded view of the lens elements according to the 1st example of the 3rd embodiment in FIG. 3A.

FIG. 3C is a schematic view of the space adjusting structure 340 under the first environment according to the 1st example of the 3rd embodiment in FIG. 3B. FIG. 3D is a schematic view of the space adjusting structure 340 under the second environment according to the 1st example of the 3rd embodiment in FIG. 3B. FIG. 3E is a schematic view of the space adjusting structure 350 under the first environment according to the 1st example of the 3rd embodiment in FIG. 3B. FIG. 3F is a schematic view of the space adjusting structure 350 under the second environment according to the 1st example of the 3rd embodiment in FIG. 3B. FIG. 3G is an exploded view of the lens elements 311, 312 according to the 1st example of the 3rd embodiment in FIG. 3A. FIG. 3H is an exploded view of the lens elements 312, 313 according to the 1st example of the 3rd embodiment in FIG. 3A. In FIGS. 3B to 3H, according to the 1st example of the 3rd embodiment, the lens element 311 can be a first lens element, the lens element 312 can be a second lens element, and the lens element 313 can be a third lens element, wherein a diameter of the first lens element is smaller than a diameter of the second lens element, and the diameter of the second lens element is smaller than a diameter of the third lens element.

The first lens element includes a first optical effective portion 311a and a first peripheral portion 311b, wherein the optical axis X passes through the first optical effective portion 311a, and the first peripheral portion 311b is disposed around the first optical effective portion 311a. The second lens element is disposed on an image side of the first lens element, and includes a second optical effective portion 312a and a second peripheral portion 312b, wherein the optical axis X passes through the second optical effective portion 312a, the second peripheral portion 312b is disposed around the second optical effective portion 312a, and an object-side surface of the second peripheral portion 312b is directly contacted with an image-side surface of the first peripheral portion 311b. The third lens element is disposed on an image side of the second lens element, and includes a third optical effective portion 313a and a third peripheral portion 313b, wherein the optical axis X passes through the third optical effective portion 313a, the third peripheral portion 313b is disposed around the third optical effective portion 313a, and an object-side surface of the third peripheral portion 313b is directly contacted with an image-side surface of the second peripheral portion 312b.

In FIGS. 3C, 3D and 3G, the space adjusting structure 340 is formed via the first peripheral portion 311b of the first lens element and the second peripheral portion 312b of the second lens element, and the space adjusting structure 340 includes a frustum surface 341, a spatial frustum surface 342, a corresponding structure 343 and a spatial layer 344. The frustum surface 341 is disposed on the object-side surface of the second peripheral portion 312b and disposed around the optical axis X, and an object-side end of the frustum surface 341 is farther from the optical axis X than an image-side end of the frustum surface 341 from the optical axis X. The spatial frustum surface 342 is disposed on the object-side surface of the second peripheral portion 312b and disposed around the optical axis X, and an object-side end of the spatial frustum surface 342 is closer to the optical axis X than an image-side end of the spatial frustum surface 342 to the optical axis X. The corresponding structure 343 is disposed on the image-side surface of the first peripheral portion 311b and correspondingly disposed on the frustum surface 341 and the spatial frustum surface 342. The spatial layer 344 is formed between the spatial frustum surface 342 and the corresponding structure 343, so that the spatial frustum surface 342 and the corresponding structure 343 are disposed at intervals.

In FIGS. 3E, 3F and 3H, the space adjusting structure 350 is formed via the second peripheral portion 312b of the second lens element and the third peripheral portion 313b of the third lens element, wherein the space adjusting structure 350 includes a frustum surface 351, a spatial frustum surface 352 and a corresponding structure 353. The frustum surface 351 is disposed on the object-side surface of the third peripheral portion 313b and disposed around the optical axis X, and an object-side end of the frustum surface 351 is closer to the optical axis X than an image-side end of the frustum surface 351 to the optical axis X. The spatial frustum surface 352 is disposed on the object-side surface of the third peripheral portion 313b and disposed around the optical axis X, and an object-side end of the spatial frustum surface 352 is farther from the optical axis X than an image-side end of the spatial frustum surface 352 from the optical axis X. The corresponding structure 353 is disposed on the image-side surface of the second peripheral portion 312b and correspondingly disposed on the frustum surface 351.

In particular, the interference between the optical elements after the variety of the environmental condition can be reduced via the structural design of the space adjusting structures 340, 350. Therefore, the stress generated owing to the interference to lead the deformation of the optical lens elements can be avoided, and the stability of the optical quality can be further maintained, wherein the variety of the environmental condition can be the variety of temperature or the variety of humidity. Further, when the expansion rate of the second lens element about the environmental variety is larger than the expansion rate of the first lens element about the environmental variety and the expansion rate of the third lens element about the environmental variety, the interference owing to the expansion can be avoided via the aforementioned structure.

In FIGS. 3C and 3D, the second peripheral portion 312b includes a bearing surface 312c vertical to the optical axis X, and the bearing surface 312c and the first peripheral portion 311b are directly contacted. Therefore, the axial assembling stability of the second lens element can be promoted.

In FIGS. 3C and 3D, a temperature Ta of the first environment is 293.1 K, a relative humidity RHa of the first environment is 50%, a temperature Tb of the second environment is 358.1K, and a relative humidity RHb of the second environment is 50%, wherein when the imaging lens assembly 300 is in the first environment, the frustum surface 341 and the corresponding structure 343 are directly contacted; when the imaging lens assembly 300 is in the second environment, the frustum surface 341 and the corresponding structure 343 are disposed at intervals.

In FIGS. 3E and 3F, a temperature Ta of the first environment is 263.1 K, a relative humidity RHa of the first environment is 50%, a temperature Tb of the second environment is 358.1K, and a relative humidity RHb of the second environment is 35%, wherein when the imaging lens assembly 300 is in the first environment, the frustum surface 351 and the corresponding structure 353 are directly contacted; when the imaging lens assembly 300 is in the second environment, the frustum surface 351 and the corresponding structure 353 are disposed at intervals.

It should be mentioned that the line segments of chain line in FIGS. 3C to 3F are configured to indicate the portion of directly contact.

In FIGS. 3C to 3F, when the imaging lens assembly 300 is in the first environment, a minimum spacing distance between the spatial frustum surface 342 and the corresponding structure 343 of the one of the space adjusting structures (that is, the space adjusting structure 340) is Gγ; when the imaging lens assembly 300 is in a second environment, the minimum spacing distance between the spatial frustum surface 342 and the corresponding structure 343 of the one of the space adjusting structures is Gγ'; on a cross section along the optical axis X, an angle between the frustum surface 341 and the spatial frustum surface 342 of the one of the space adjusting structures is θγ, an angle between the frustum surface 351 and the spatial frustum surface 352 of the other one of the space adjusting structures (that is, the space adjusting structure 350) is θδ, and an abbe number of the second lens element (that is, the lens element 312) is Vd, the following conditions of Table 3A are satisfied.

TABLE 3A

| Gγ (μm) | 12 | θγ (degree) | 50 |
| Gγ' (μm) | 4 | θδ (degree) | 55 |
| Vd | 18.4 | | |

Figure 3J:
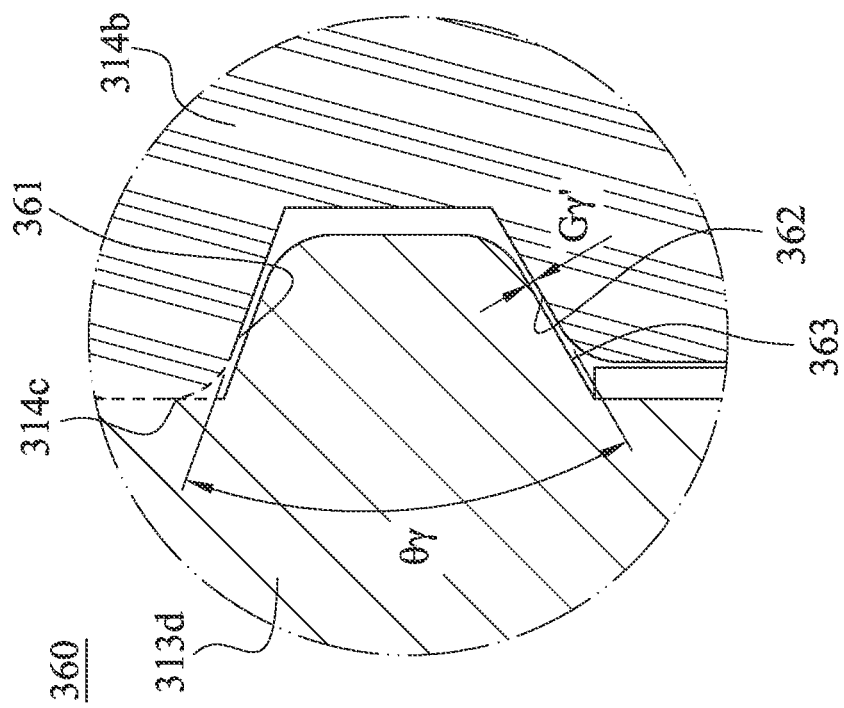
FIG. 3J is a schematic view of the space adjusting structure under the second environment according to the 2nd example of the 3rd embodiment in FIG. 3B.
Figure 3I:
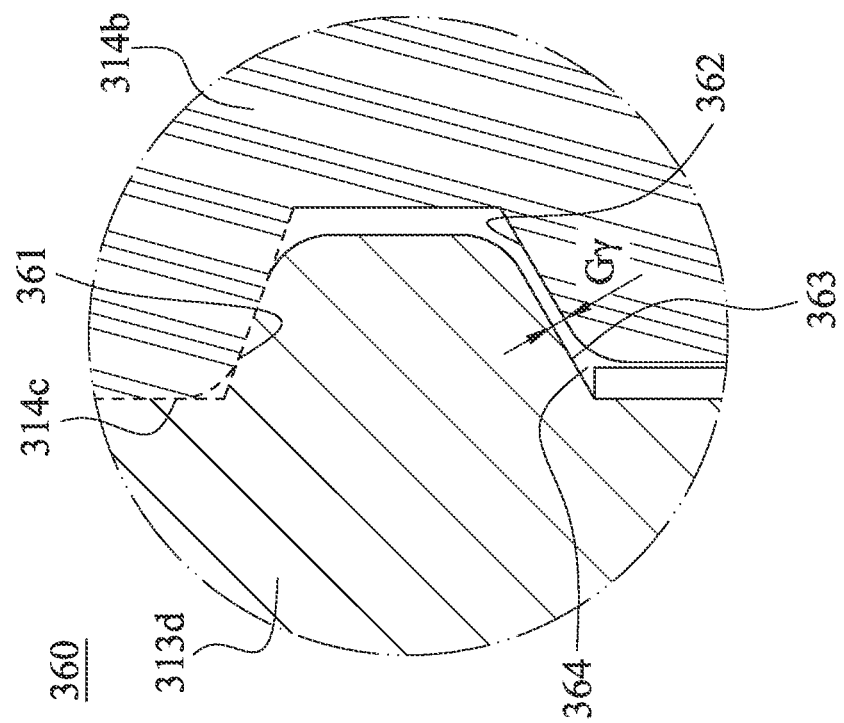
FIG. 3I is a schematic view of the space adjusting structure under the first environment according to the 2nd example of the 3rd embodiment in FIG. 3B.
Figure 3K:
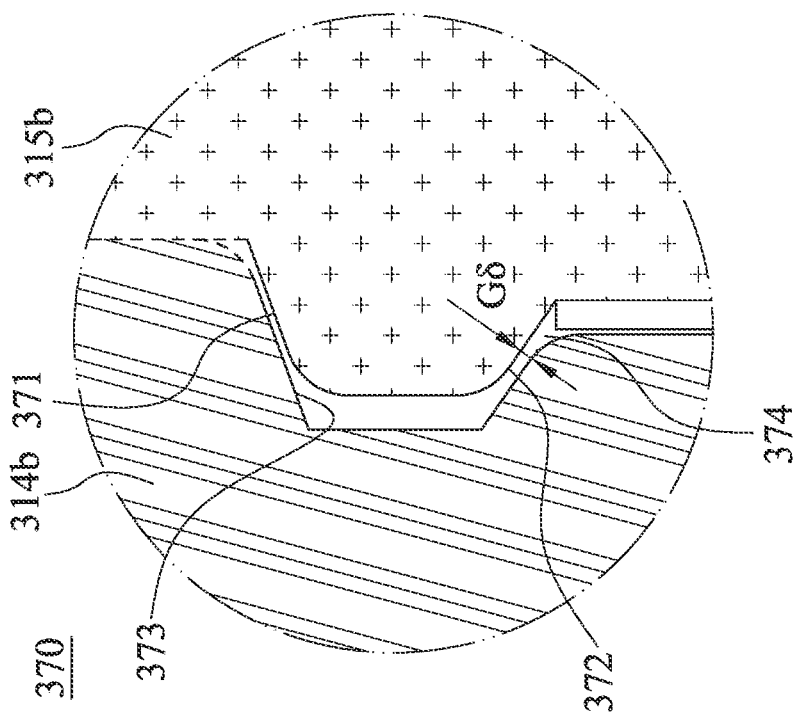
FIG. 3K is a schematic view of the space adjusting structure under the first environment according to the 2nd example of the 3rd embodiment in FIG. 3B.
Figure 3L:
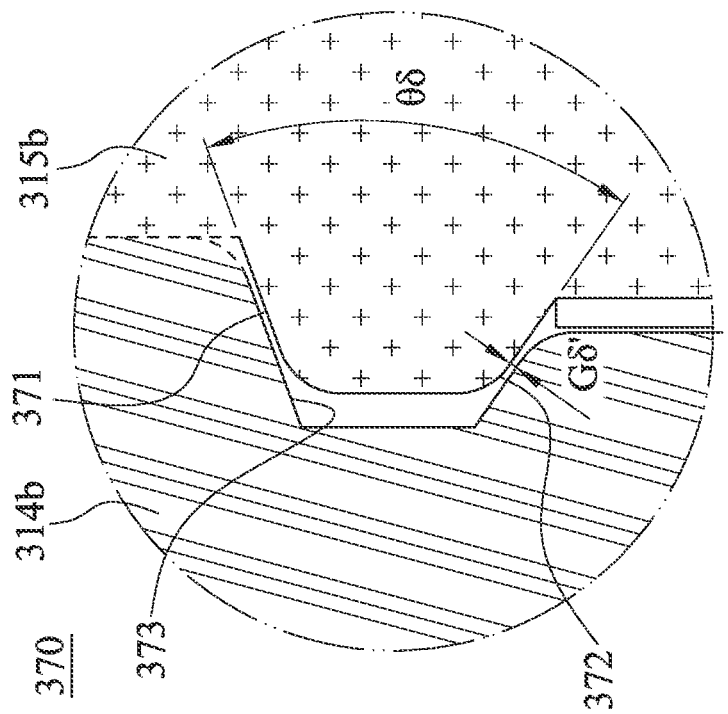
FIG. 3L is a schematic view of the space adjusting structure under the second environment according to the 2nd example of the 3rd embodiment in FIG. 3B.

FIG. 3I is a schematic view of the space adjusting structure 360 under the first environment according to the 2nd example of the 3rd embodiment in FIG. 3B. FIG. 3J is a schematic view of the space adjusting structure 360 under the second environment according to the 2nd example of the 3rd embodiment in FIG. 3B. FIG. 3K is a schematic view of the space adjusting structure 370 under the first environment according to the 2nd example of the 3rd embodiment in FIG. 3B. FIG. 3L is a schematic view of the space adjusting structure 370 under the second environment according to the 2nd example of the 3rd embodiment in FIG. 3B. In FIGS. 3I to 3L, according to the 2nd example of the 3rd embodiment, the lens element 313 can be a first lens element, the lens element 314 can be a second lens element, and the lens element 315 can be a third lens element, wherein a diameter of the first lens element is smaller than a diameter of the second lens element, and the diameter of the second lens element is smaller than a diameter of the third lens element.

The first lens element includes a first optical effective portion (its reference numeral is omitted) and a first peripheral portion 313d, wherein the optical axis X passes through the first optical effective portion, and the first peripheral portion 313d is disposed around the first optical effective portion. The second lens element is disposed on an image side of the first lens element, and includes a second optical effective portion (its reference numeral is omitted) and a second peripheral portion 314b, wherein the optical axis X passes through the second optical effective portion, the second peripheral portion 314b is disposed around the second optical effective portion, and an object-side surface of the second peripheral portion 314b is directly contacted with an image-side surface of the first peripheral portion 313d. The third lens element is disposed on an image side of the second lens element, and includes a third optical effective portion (its reference numeral is omitted) and a third peripheral portion 315b, wherein the optical axis X passes through the third optical effective portion, the third peripheral portion 315b is disposed around the third optical effective portion, and an object-side surface of the third peripheral portion 315b is directly contacted with an image-side surface of the second peripheral portion 314b.

In FIGS. 3I and 3J, the space adjusting structure 360 is formed via the first peripheral portion 313d of the first lens element and the second peripheral portion 314b of the second lens element, and the space adjusting structure 360 includes a frustum surface 361, a spatial frustum surface 362, a corresponding structure 363 and a spatial layer 364. The frustum surface 361 is disposed on the object-side surface of the second peripheral portion 314b and disposed around the optical axis X, and an object-side end of the frustum surface 361 is farther from the optical axis X than an image-side end of the frustum surface 361 from the optical axis X. The spatial frustum surface 362 is disposed on the object-side surface of the second peripheral portion 314b and disposed around the optical axis X, and an object-side end of the spatial frustum surface 362 is closer to the optical axis X than an image-side end of the spatial frustum surface 362 to the optical axis X. The corresponding structure 363 is disposed on the image-side surface of the first peripheral portion 313d and correspondingly disposed on the frustum surface 361 and the spatial frustum surface 362. The spatial layer 364 is formed between the spatial frustum surface 362 and the corresponding structure 363, so that the spatial frustum surface 362 and the corresponding structure 363 are disposed at intervals.

In FIGS. 3K and 3L, the space adjusting structure 370 is formed via the second peripheral portion 314b of the second lens element and the third peripheral portion 315b of the third lens element, wherein the space adjusting structure 370 includes a frustum surface 371, a spatial frustum surface 372, a corresponding structure 373 and a spatial layer 374. The frustum surface 371 is disposed on the object-side surface of the third peripheral portion 315b and disposed around the optical axis X, and an object-side end of the frustum surface 371 is closer to the optical axis X than an image-side end of the frustum surface 371 to the optical axis X. The spatial frustum surface 372 is disposed on the object-side surface of the third peripheral portion 315b and disposed around the optical axis X, and an object-side end of the spatial frustum surface 372 is farther from the optical axis X than an image-side end of the spatial frustum surface 372 from the optical axis X. The corresponding structure 373 is disposed on the image-side surface of the second peripheral portion 314b and correspondingly disposed on the frustum surface 371 and the spatial frustum surface 372. The spatial layer 374 is formed between the spatial frustum surface 372 and the corresponding structure 373, so that the spatial frustum surface 372 and the corresponding structure 373 are disposed at intervals.

In particular, the interference between the optical elements after the variety of the environmental condition can be reduced via the structural design of the space adjusting structures 360, 370. Therefore, the stress generated owing to the interference to lead the deformation of the optical lens elements can be avoided, and the stability of the optical quality can be further maintained. Further, when the expansion rate of the second lens element about the environmental variety is larger than the expansion rate of the first lens element about the environmental variety and the expansion rate of the third lens element about the environmental variety, the interference owing to the expansion can be avoided via the aforementioned structure.

In FIGS. 3I and 3J, the second peripheral portion 314b includes a bearing surface 314c vertical to the optical axis X, and the bearing surface 314c and the first peripheral portion 313d are directly contacted. Therefore, the axial assembling stability of the second lens element can be promoted.

In FIGS. 3I and 3J, a temperature Ta of the first environment is 293.1 K, a relative humidity RHa of the first environment is 30%, a temperature Tb of the second environment is 283.1K, and a relative humidity RHb of the second environment is 95%, wherein when the imaging lens assembly 300 is in the first environment, the frustum surface 361 and the corresponding structure 363 are directly contacted; when the imaging lens assembly 300 is in the second environment, the frustum surface 361 and the corresponding structure 363 are disposed at intervals.

In FIGS. 3K and 3L, a temperature Ta of the first environment is 293.1 K, a relative humidity RHa of the first environment is 30%, a temperature Tb of the second environment is 358.1K, and a relative humidity RHb of the second environment is 50%, wherein when the imaging lens assembly 300 is in the first environment, the frustum surface 371 and the corresponding structure 373 are disposed at intervals; when the imaging lens assembly 300 is in the second environment, the frustum surface 371 and the corresponding structure 373 are disposed at intervals.

It should be mentioned that the line segments of chain line in FIGS. 3I to 3L are configured to indicate the portion of directly contact.

In FIGS. 3I to 3L, when the imaging lens assembly 300 is in the first environment, a minimum spacing distance between the spatial frustum surface 362 and the corresponding structure 363 of the one of the space adjusting structures (that is, the space adjusting structure 360) is G$\gamma$, a minimum spacing distance between the spatial frustum surface 372 and the corresponding structure 373 of the other one of the space adjusting structures (that is, the space adjusting structure 370) is G$\sigma$; when the imaging lens assembly 300 is in a second environment, the minimum spacing distance between the spatial frustum surface 362 and the corresponding structure 363 of the one of the space adjusting structures is G$\gamma$', the minimum spacing distance between the spatial frustum surface 372 and the corresponding structure 373 of the other one of the space adjusting structures is G$\delta$'; on a cross section along the optical axis X, an angle between the frustum surface 361 and the spatial frustum surface 362 of the one of the space adjusting structures is $\theta\gamma$, and an angle between the frustum surface 371 and the spatial frustum surface 372 of the other one of the space adjusting structures is $\theta\delta$, the following conditions of Table 3B are satisfied.

TABLE 3B

| G$\gamma$ ($\mu$m) | 21 | G$\delta$' ($\mu$m) | 5 |
|---|---|---|---|
| G$\gamma$' ($\mu$m) | 10 | $\theta\gamma$ (degree) | 50 |
| G$\delta$ ($\mu$m) | 13 | $\theta\delta$ (degree) | 55 |

Further, all of other structures and dispositions according to the 3rd embodiment are the same as the structures and the dispositions according to the 1st embodiment, and will not be described again herein.

4th Embodiment

Figure 4A:
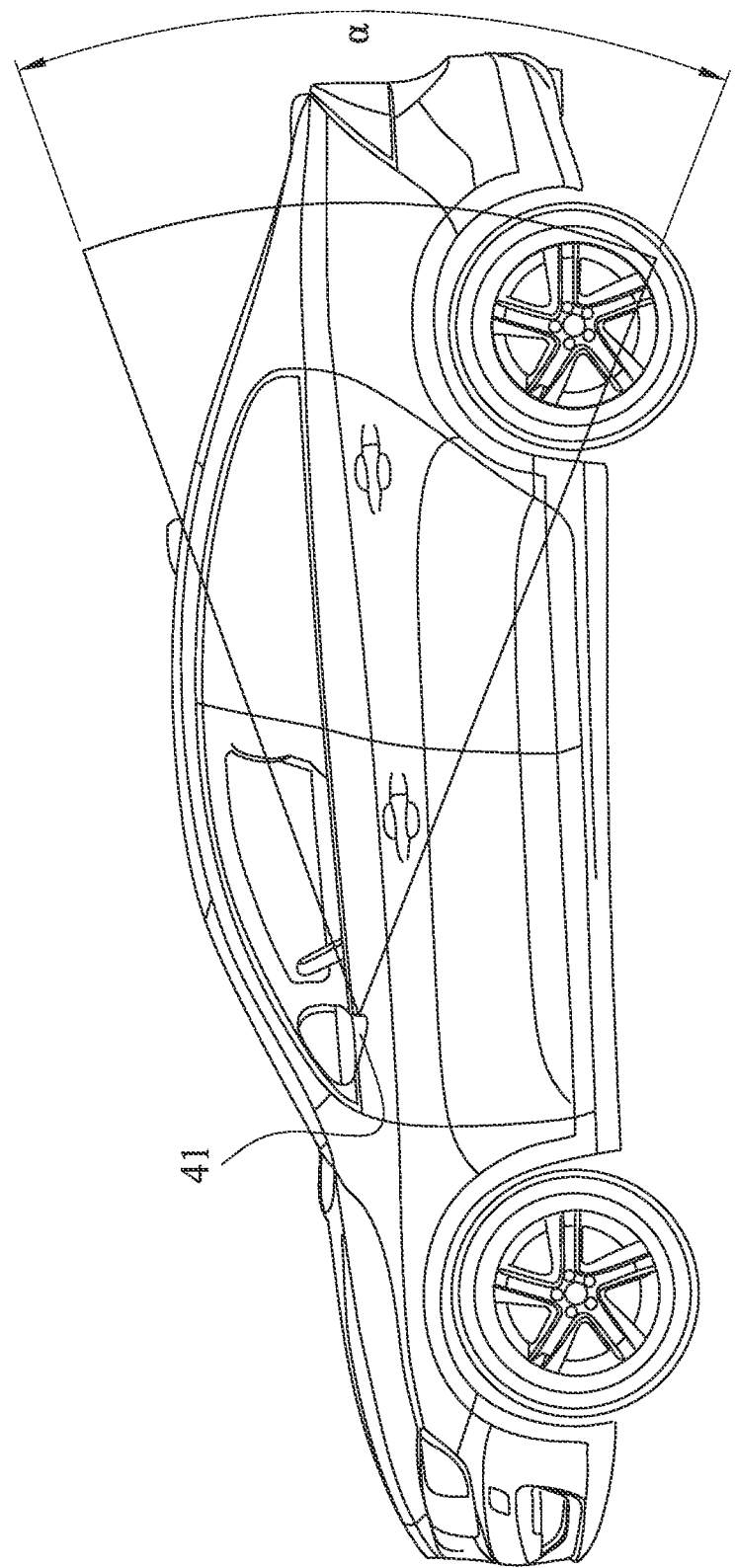
FIG. 4A is a schematic view of a vehicle instrument according to the 4th embodiment of the present disclosure.
Figure 4B:
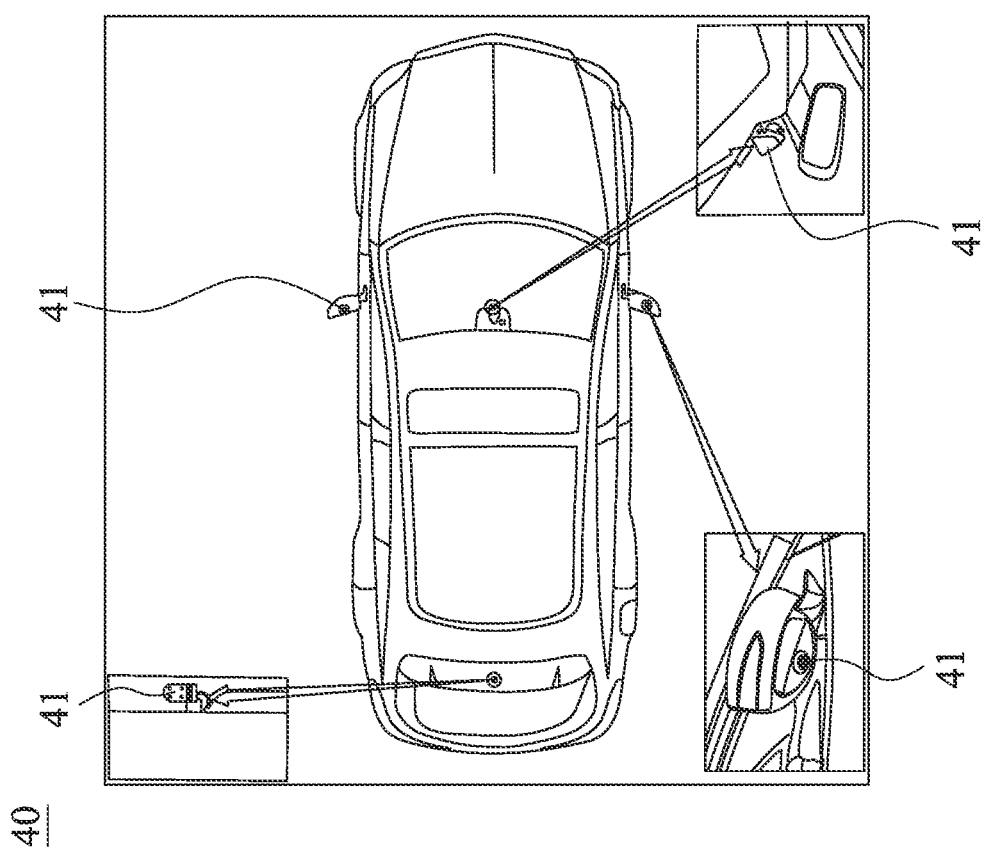
FIG. 4B is another schematic view of the vehicle instrument according to the 4th embodiment in FIG. 4A.
Figure 4C:
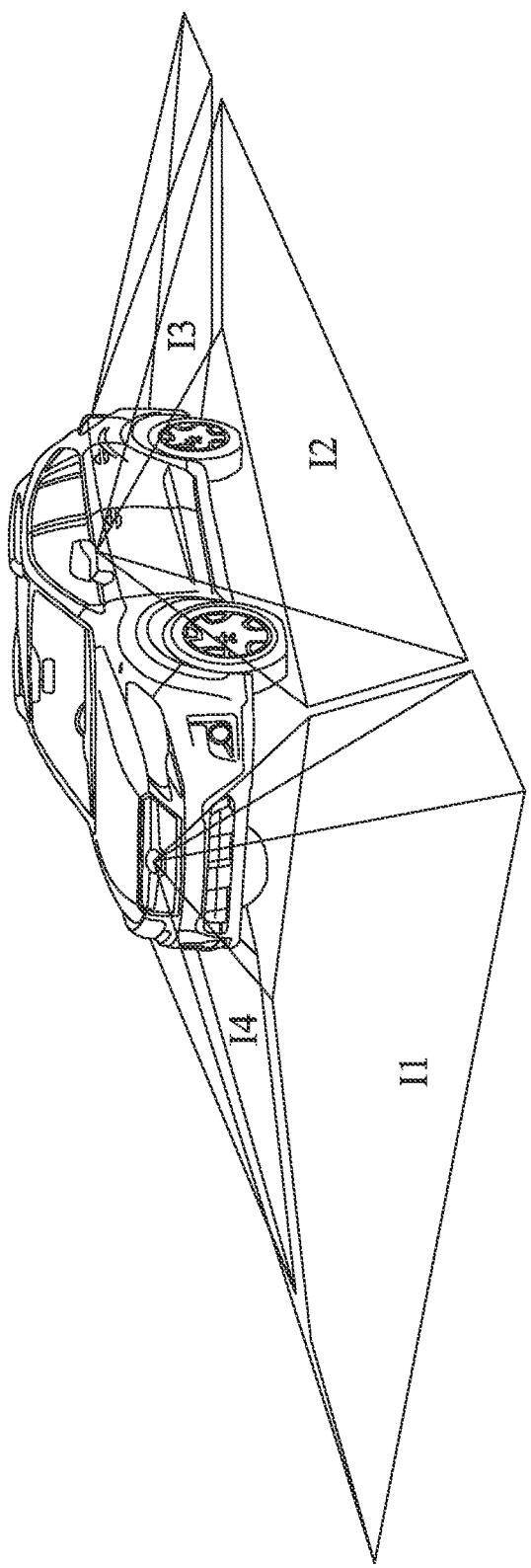
FIG. 4C is still another schematic view of the vehicle instrument according to the 4th embodiment in FIG. 4A.
Figure 4D:
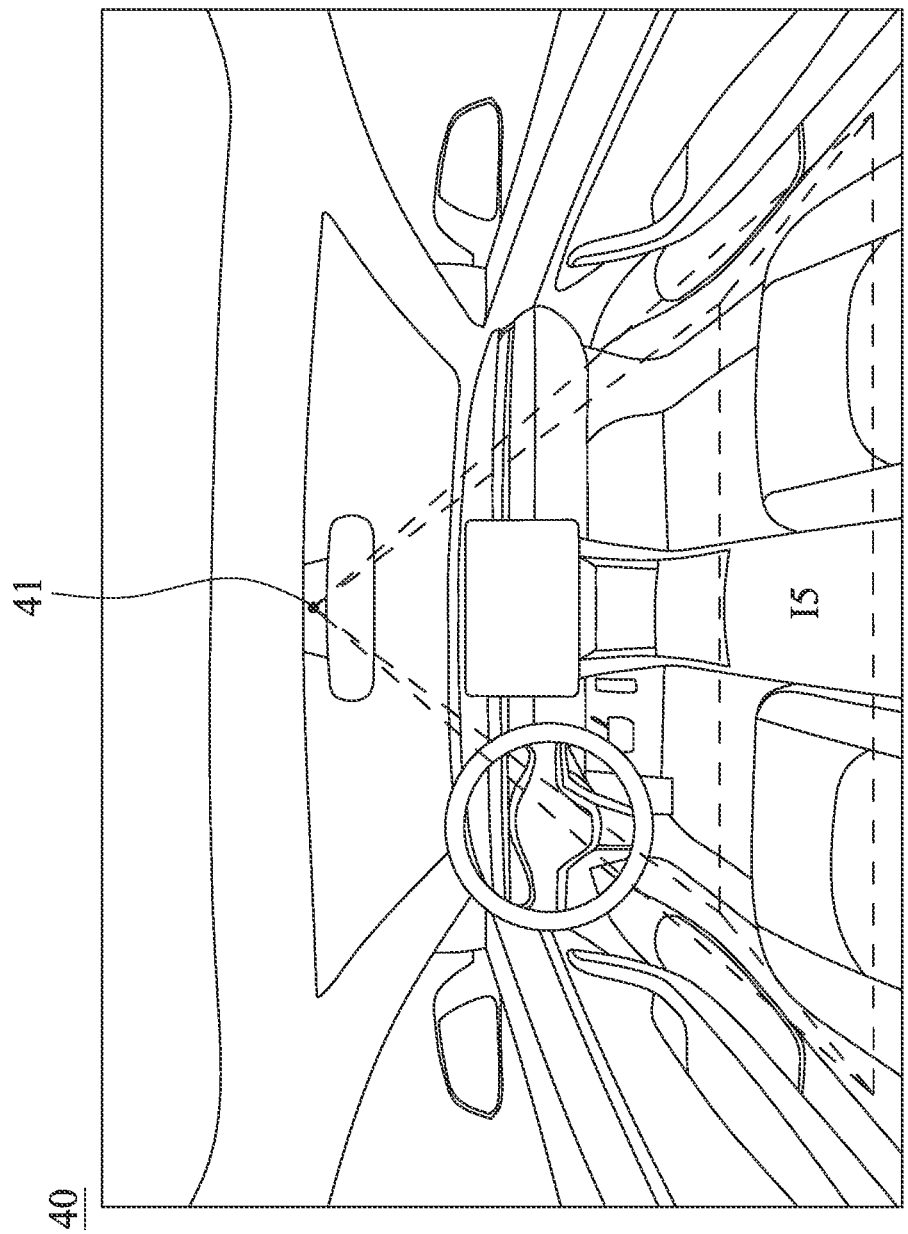
FIG. 4D is another schematic view of the vehicle instrument according to the 4th embodiment in FIG. 4A.

FIG. 4A is a schematic view of a vehicle instrument 40 according to the 4th embodiment of the present disclosure. FIG. 4B is another schematic view of the vehicle instrument 40 according to the 4th embodiment in FIG. 4A. FIG. 4C is still another schematic view of the vehicle instrument 40 according to the 4th embodiment in FIG. 4A. FIG. 4D is another schematic view of the vehicle instrument 40 according to the 4th embodiment in FIG. 4A. In FIGS. 4A to 4D, the vehicle instrument 40 includes a plurality of imaging lens assemblies 41. According to the 4th embodiment, a number of the imaging lens assemblies 41 is six, but the present disclosure is not limited thereto. In particular, the imaging lens assembly can be one of the imaging lens assemblies according to the aforementioned 1st embodiment to the 3rd embodiment, but the present disclosure is not limited thereto.

In FIGS. 4A and 4B, the imaging lens assemblies 41 are automotive imaging lens assemblies, two of the imaging lens assemblies 41 are located under rearview mirrors on a left side and a right side, respectively, and the aforementioned imaging lens assemblies 41 are configured to capture the image information of a visual angle $\alpha$. In particular, the visual angle $\alpha$ can satisfy the following condition: 40 degrees<$\alpha$<90 degrees. Therefore, the image information in the regions of two lanes on the left side and the right side can be captured.

In FIG. 4B, another two of the imaging lens assemblies 41 can be disposed in the inner space of the vehicle instrument 40. In particular, the aforementioned two imaging lens assemblies 41 are disposed on a location close to the rearview mirror inside the vehicle instrument 40 and a location close to the rear car window, respectively. Moreover, the imaging lens assemblies 41 can be further disposed on the rearview mirrors on the left side and the right side except the mirror surface, respectively, but the present disclosure is not limited thereto.

In FIG. 4C, another two of the imaging lens assemblies 41 can be disposed on a front end of the vehicle instrument 40 and a rear end of the vehicle instrument 40, respectively. By disposing the imaging lens assemblies 41 on the front end and the rear end of the vehicle instrument 40 and under the rearview mirror on the left side of the vehicle instrument 40 and the right side of the vehicle instrument 40, it is favorable for the drivers obtaining external space informations in addition to the driving seat, such as external space informations I1, I2, I3, I4, but the present disclosure is not limited thereto. Therefore, more visual angles can be provided to reduce the blind spot, so that the driving safety can be improved.

In FIG. 4D, the imaging lens assembly 41 disposed on the rearview mirror in the vehicle instrument 40 can be configured to capture an inner space information 15, so as to enhance the driving safety. Generally speaking, when the vehicle instrument of the prior art is parked and exposed to the sun, the effect of temperature drift of the imaging lens assembly is caused via the high temperature in the vehicle instrument, and the imaging lens assembly is even damaged, so as to influence the driving safety. The interference stress caused between the optical elements owing to the variety of the environmental condition can be avoided by disposing the space adjusting structures of the imaging lens assemblies 41 of the present disclosure, and hence the stability can be still maintained under the environment of the severe variety of the temperature and the imaging quality can be maintained.

5th Embodiment

Figure 5A:
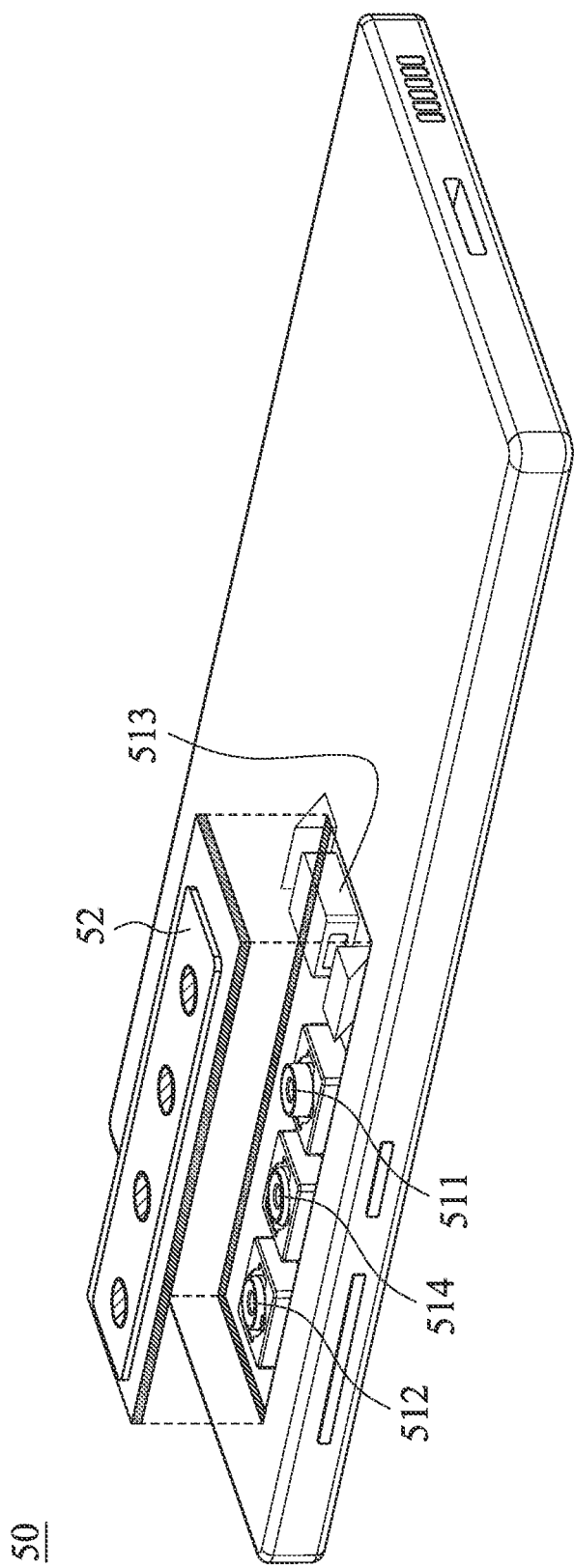
FIG. 5A is a schematic view of an electronic device according to the 5th embodiment of the present disclosure.
Figure 5B:
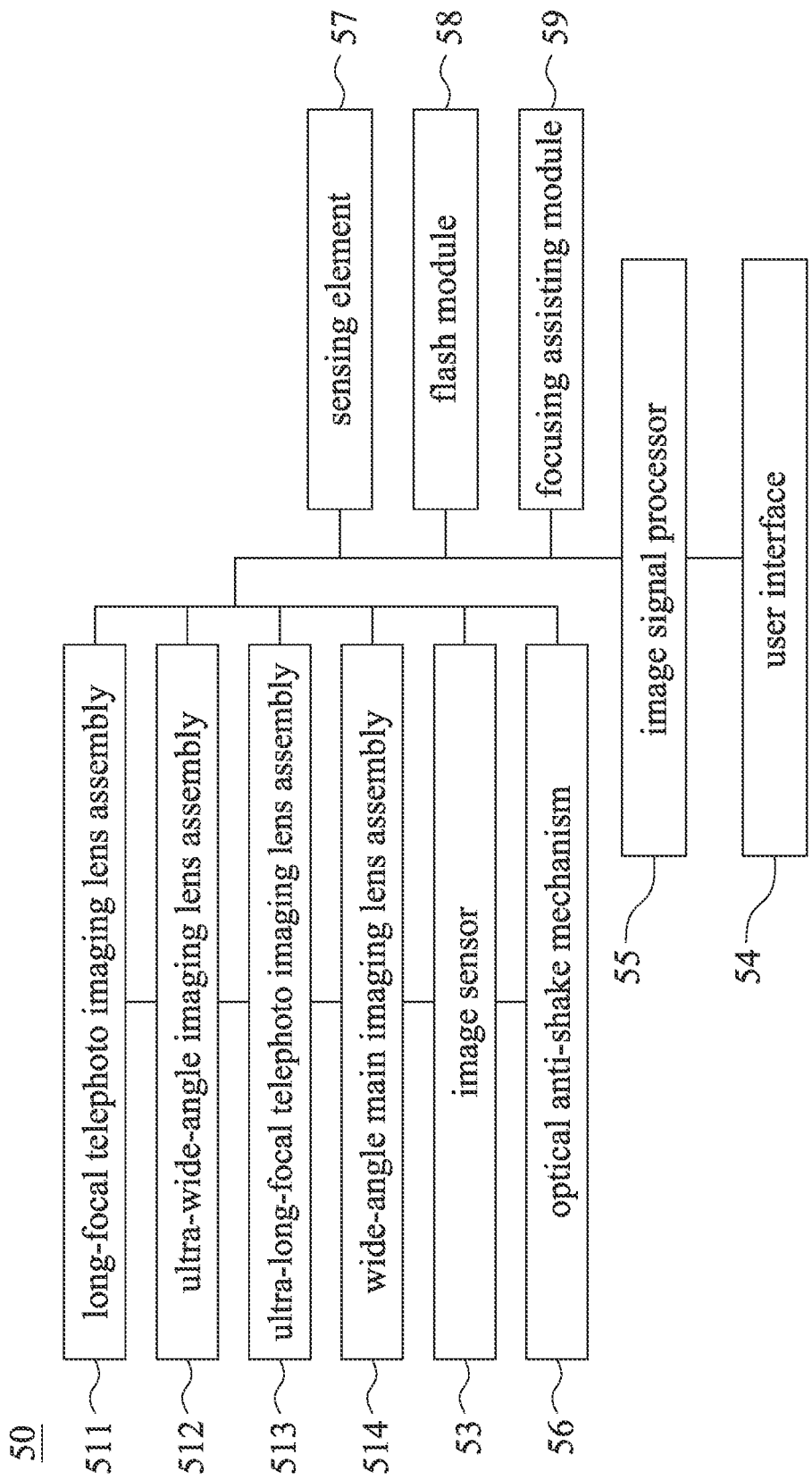
FIG. 5B is a block diagram of the electronic device according to the 5th embodiment in FIG. 5A.

FIG. 5A is a schematic view of an electronic device 50 according to the 5th embodiment of the present disclosure. FIG. 5B is a block diagram of the electronic device 50 according to the 5th embodiment in FIG. 5A. In FIGS. 5A and 5B, the electronic device 50 is a smart phone, and includes an imaging lens assembly.

According to the 5th embodiment, the electronic device 50 includes four imaging lens assemblies, and the imaging lens assemblies are a long-focal telephoto imaging lens assembly 511, an ultra-wide-angle imaging lens assembly 512, an ultra-long-focal telephoto imaging lens assembly 513 and a wide-angle main imaging lens assembly 514, wherein a visual angle of the long-focal telephoto imaging lens assembly 511 is between 30 degrees and 60 degrees, a visual angle of the ultra-wide-angle imaging lens assembly 512 is between 93 degrees and 175 degrees, a visual angle of the ultra-long-focal telephoto imaging lens assembly 513 is between 5 degrees and 30 degrees, and a visual angle of the wide-angle main imaging lens assembly 514 is between 65 degrees and 90 degrees, but the present disclosure is not limited thereto. Moreover, the function of optical zoom of the electronic device 50 can be obtained by switching the imaging lens assemblies with the different visual angles. It should be mentioned that a lens cover 52 is only configured to indicate the long-focal telephoto imaging lens assembly 511, the ultra-wide-angle imaging lens assembly 512, the ultra-long-focal telephoto imaging lens assembly 513 and the wide-angle main imaging lens assembly 514 disposed in the electronic device 50, and the schematic view is not configured to mean that the lens cover 52 is removable. In particular, the long-focal telephoto imaging lens assembly 511, the ultra-wide-angle imaging lens assembly 512, the ultra-long-focal telephoto imaging lens assembly 513 and the wide-angle main imaging lens assembly 514 can be one of the imaging lens assemblies according to the aforementioned 1st embodiment to the 3rd embodiment, but the present disclosure is not limited thereto.

The electronic device 50 further includes an image sensor 53 and a user interface 54, wherein the image sensor 53 is disposed on an image surface (not shown) of the long-focal telephoto imaging lens assembly 511, the ultra-wide-angle imaging lens assembly 512, the ultra-long-focal telephoto imaging lens assembly 513 and the wide-angle main imaging lens assembly 514, and the user interface 54 can be a touch screen or a display screen, but the present disclosure is not limited thereto.

Moreover, users enter a shooting mode via the user interface 54 of the electronic device 50. At this moment, the imaging light is gathered on the image sensor 53 via the long-focal telephoto imaging lens assembly 511, the ultra-wide-angle imaging lens assembly 512, the ultra-long-focal telephoto imaging lens assembly 513 and the wide-angle main imaging lens assembly 514, and an electronic signal about an image is output to an image signal processor (ISP) 55.

To meet a specification of the electronic device 50, the electronic device 50 can further include an optical anti-shake mechanism 56, which can be an optical image stabilization (OIS). Furthermore, the electronic device 50 can further include at least one auxiliary optical element (its reference numeral is omitted) and at least one sensing element 57. According to the 5th embodiment, the auxiliary optical element is a flash module 58 and a focusing assisting module 59. The flash module 58 can be for compensating a color temperature, and the focusing assisting module 59 can be an infrared distance measurement component, a laser focus module, etc. The sensing element 57 can have functions for sensing physical momentum and kinetic energy, such as an accelerator, a gyroscope, a Hall Effect Element, to sense shaking or jitters applied by hands of the user or external environments. Accordingly, an auto-focusing mechanism and the optical anti-shake mechanism 56 disposed on the imaging lens assembly (that is, the long-focal telephoto imaging lens assembly 511, the ultra-wide-angle imaging lens assembly 512, the ultra-long-focal telephoto imaging lens assembly 513, the wide-angle main imaging lens assembly 514) of the electronic device 50 can be enhanced to achieve the superior image quality. Furthermore, the electronic device 50 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

Furthermore, the electronic device 50 can further include, but not be limited to, a display, a control unit, a storage unit, a random access memory (RAM), a read-only memory (ROM), or the combination thereof.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, an optical axis passing through the imaging lens assembly, and the imaging lens assembly comprising:

a first lens element, comprising:

a first optical effective portion, wherein the optical axis passes through the first optical effective portion; and a first peripheral portion disposed around the first optical effective portion;

a second lens element, disposed on an image side of the first lens element, and comprising:

a second optical effective portion, wherein the optical axis passes through the second optical effective portion; and a second peripheral portion disposed around the second optical effective portion, and an object-side surface of the second peripheral portion directly contacted with an image-side surface of the first peripheral portion;

a lens barrel, comprising:

a cylindrical portion surrounding the optical axis with the optical axis as an axis; and a plate portion connected to the cylindrical portion, extending towards a direction close to the optical axis to form a light through hole, an accommodating space formed via the cylindrical portion and the plate portion, the first lens element and the second lens element disposed in the accommodating space, and an image-side surface of the plate portion directly contacted with an object-side surface of the first peripheral portion; and two space adjusting structures, wherein one of the two space adjusting structures is formed via the first peripheral portion of the first lens element and the plate portion of the lens barrel, the other one of the two space adjusting structures is formed via the first peripheral portion of the first lens element and the second peripheral portion of the second lens element;

wherein the one of the two space adjusting structures comprises:

a frustum surface disposed on the object-side surface of the first peripheral portion and disposed around the optical axis, and an object-side end of the frustum surface closer to the optical axis than an image-side end of the frustum surface to the optical axis;

a spatial frustum surface disposed on the object-side surface of the first peripheral portion and disposed around the optical axis, and an object-side end of the spatial frustum surface farther from the optical axis than an image-side end of the spatial frustum surface from the optical axis;

a corresponding structure disposed on the image-side surface of the plate portion and correspondingly disposed on the frustum surface and the spatial frustum surface; and a spatial layer formed between the spatial frustum surface and the corresponding structure, so that the spatial frustum surface and the corresponding structure disposed at intervals;

wherein the other one of the two space adjusting structures comprises:

a frustum surface disposed on the object-side surface of the second peripheral portion and disposed around the optical axis, and an object-side end of the frustum surface farther from the optical axis than an image-side end of the frustum surface from the optical axis;

a spatial frustum surface disposed on the object-side surface of the second peripheral portion and disposed around the optical axis, and an object-side end of the spatial frustum surface closer to the optical axis than an image-side end of the spatial frustum surface to the optical axis;

a corresponding structure disposed on the image-side surface of the first peripheral portion and correspondingly disposed on the frustum surface and the spatial frustum surface; and a spatial layer formed between the spatial frustum surface and the corresponding structure, so that the spatial frustum surface and the corresponding structure disposed at intervals;

wherein when the imaging lens assembly is in a first environment, a minimum spacing distance between the spatial frustum surface and the corresponding structure of the one of the two space adjusting structures is $G\alpha$, a minimum spacing distance between the spatial frustum surface and the corresponding structure of the other one of the two space adjusting structures is $G\beta$; when the imaging lens assembly is in a second environment, the minimum spacing distance between the spatial frustum surface and the corresponding structure of the one of the two space adjusting structures is $G\alpha'$, the minimum spacing distance between the spatial frustum surface and the corresponding structure of the other one of the two space adjusting structures is $G\beta'$, and the following conditions are satisfied:

$$0 \ \mu m \leq G\alpha' < G\alpha \leq 37 \ \mu m; \text{ and}$$

$$0 \ \mu m \leq G\beta' < G\beta \leq 38 \ \mu m;$$

wherein the first environment and the second environment are satisfied at least one of a temperature-dependent relation and a humidity-dependent relation:

a temperature of the first environment being Ta, a temperature of the second environment being Tb, and the temperature-dependent relation satisfied: $6K \leq |Ta-Tb| \leq 148K$; and a relative humidity of the first environment being RHa, a relative humidity of the second environment being RHb, and the humidity-dependent relation satisfied: $7\% \leq |RHa-RHb| \leq 89\%$.

2. The imaging lens assembly of claim 1, wherein an abbe number of the second lens element is Vd, and the following condition is satisfied:

$$8 \leq Vd \leq 29.$$

3. The imaging lens assembly of claim 1, wherein when the imaging lens assembly is in the first environment, the frustum surface and the corresponding structure of the one of the two space adjusting structures are directly contacted.

4. The imaging lens assembly of claim 3, wherein when the imaging lens assembly is in the second environment, the frustum surface and the corresponding structure of the one of the two space adjusting structures are disposed at intervals.

5. The imaging lens assembly of claim 1, wherein when the imaging lens assembly is in the first environment, the frustum surface and the corresponding structure of the other one of the two space adjusting structures are directly contacted.

6. The imaging lens assembly of claim 5, wherein when the imaging lens assembly is in the second environment, the frustum surface and the corresponding structure of the other one of the two space adjusting structures are disposed at intervals.

7. The imaging lens assembly of claim 1, wherein the first peripheral portion comprises a bearing surface vertical to the optical axis, and the bearing surface and the plate portion are directly contacted.

8. The imaging lens assembly of claim 1, wherein on a cross section along the optical axis, an angle between the frustum surface and the spatial frustum surface of the one of the two space adjusting structures is θα, and the following condition is satisfied:

18 degrees≤θα≤130 degrees.

9. The imaging lens assembly of claim 1, wherein on a cross section along the optical axis, an angle between the frustum surface and the spatial frustum surface of the other one of the two space adjusting structures is θβ, and the following condition is satisfied:

18 degrees≤θβ≤130 degrees.

10. An imaging lens assembly, an optical axis passing through the imaging lens assembly, and the imaging lens assembly comprising:
    a first lens element, comprising:
        a first optical effective portion, wherein the optical axis passes through the first optical effective portion; and
        a first peripheral portion disposed around the first optical effective portion;
    a lens barrel, comprising:
        a cylindrical portion surrounding the optical axis with the optical axis as an axis; and
        a plate portion connected to the cylindrical portion, extending towards a direction close to the optical axis to form a light through hole, an accommodating space formed via the cylindrical portion and the plate portion, the first lens element disposed in the accommodating space, and an image-side surface of the plate portion directly contacted with an object-side surface of the first peripheral portion; and
    a space adjusting structure, wherein the space adjusting structure is formed via the first peripheral portion of the first lens element and the plate portion of the lens barrel, and the space adjusting structure comprises:
        a frustum surface disposed on the object-side surface of the first peripheral portion and disposed around the optical axis, and an object-side end of the frustum surface closer to the optical axis than an image-side end of the frustum surface to the optical axis;
        a spatial frustum surface disposed on the object-side surface of the first peripheral portion and disposed around the optical axis, and an object-side end of the spatial frustum surface farther from the optical axis than an image-side end of the spatial frustum surface from the optical axis;
        a corresponding structure disposed on the image-side surface of the plate portion and correspondingly disposed on the frustum surface and the spatial frustum surface; and
        a spatial layer formed between the spatial frustum surface and the corresponding structure, so that the spatial frustum surface and the corresponding structure disposed at intervals;
    wherein when the imaging lens assembly is in a first environment, a minimum spacing distance between the spatial frustum surface and the corresponding structure is G; when the imaging lens assembly is in a second environment, the minimum spacing distance between the spatial frustum surface and the corresponding structure is G', and the following condition is satisfied:

0 μm≤G'<G≤37 μm;

wherein the first environment and the second environment are satisfied at least one of a temperature-dependent relation and a humidity-dependent relation:
        a temperature of the first environment being Ta, a temperature of the second environment being Tb, and the temperature-dependent relation satisfied: 6K≤|Ta−Tb|≤148K; and
        a relative humidity of the first environment being RHa, a relative humidity of the second environment being RHb, and the humidity-dependent relation satisfied: 7%≤|RHa−RHb|≤89%.

11. The imaging lens assembly of claim 10, wherein when the imaging lens assembly is in the first environment, the frustum surface and the corresponding structure are directly contacted.

12. The imaging lens assembly of claim 11, wherein when the imaging lens assembly is in the second environment, the frustum surface and the corresponding structure are disposed at intervals.

13. The imaging lens assembly of claim 10, wherein the first peripheral portion comprises a bearing surface vertical to the optical axis, and the bearing surface and the plate portion are directly contacted.

14. The imaging lens assembly of claim 10, wherein on a cross section along the optical axis, an angle between the frustum surface and the spatial frustum surface is θ, and the following condition is satisfied:

18 degrees≤θ≤130 degrees.

15. An imaging lens assembly, an optical axis passing through the imaging lens assembly, and the imaging lens assembly comprising:
    a first lens element, comprising:
        a first optical effective portion, wherein the optical axis passes through the first optical effective portion; and
        a first peripheral portion disposed around the first optical effective portion;
    a second lens element, disposed on an image side of the first lens element, and comprising:
        a second optical effective portion, wherein the optical axis passes through the second optical effective portion; and
        a second peripheral portion disposed around the second optical effective portion, and an object-side surface of the second peripheral portion directly contacted with an image-side surface of the first peripheral portion;
    a third lens element, disposed on an image side of the second lens element, and comprising:
        a third optical effective portion, wherein the optical axis passes through the third optical effective portion; and
        a third peripheral portion disposed around the third optical effective portion, and an object-side surface of the third peripheral portion directly contacted with an image-side surface of the second peripheral portion; and
    two space adjusting structures, wherein one of the two space adjusting structures is formed via the first peripheral portion of the first lens element and the second peripheral portion of the second lens element, the other one of the two space adjusting structures is formed via the second peripheral portion of the second lens element and the third peripheral portion of the third lens element;
    wherein the one of the two space adjusting structures comprises:
        a frustum surface disposed on the object-side surface of the second peripheral portion and disposed around the optical axis, and an object-side end of the frustum surface farther from the optical axis than an image-side end of the frustum surface from the optical axis;
a spatial frustum surface disposed on the object-side surface of the second peripheral portion and disposed around the optical axis, and an object-side end of the spatial frustum surface closer to the optical axis than an image-side end of the spatial frustum surface to the optical axis;
a corresponding structure disposed on the image-side surface of the first peripheral portion and correspondingly disposed on the frustum surface and the spatial frustum surface; and
a spatial layer formed between the spatial frustum surface and the corresponding structure, so that the spatial frustum surface and the corresponding structure disposed at intervals;
wherein the other one of the two space adjusting structures comprises:
a frustum surface disposed on the object-side surface of the third peripheral portion and disposed around the optical axis, and an object-side end of the frustum surface closer to the optical axis than an image-side end of the frustum surface to the optical axis;
a spatial frustum surface disposed on the object-side surface of the third peripheral portion and disposed around the optical axis, and an object-side end of the spatial frustum surface farther from the optical axis than an image-side end of the spatial frustum surface from the optical axis;
a corresponding structure disposed on the image-side surface of the second peripheral portion and correspondingly disposed on the frustum surface and the spatial frustum surface; and
a spatial layer formed between the spatial frustum surface and the corresponding structure, so that the spatial frustum surface and the corresponding structure disposed at intervals;
wherein when the imaging lens assembly is in a first environment, a minimum spacing distance between the spatial frustum surface and the corresponding structure of the one of the two space adjusting structures is $G\gamma$, a minimum spacing distance between the spatial frustum surface and the corresponding structure of the other one of the two space adjusting structures is $G\delta$; when the imaging lens assembly is in a second environment, the minimum spacing distance between the spatial frustum surface and the corresponding structure of the one of the two space adjusting structures is $G\gamma'$, the minimum spacing distance between the spatial frustum surface and the corresponding structure of the other one of the two space adjusting structures is $G\delta'$; an abbe number of the second lens element is Vd, and the following conditions are satisfied:

$3\ \mu m \leq G\gamma' < G\gamma \leq 38\ \mu m;$ $3\ \mu m \leq G\delta' < G\delta \leq 39\ \mu m;$ and $8 \leq Vd \leq 29;$ wherein the first environment and the second environment are satisfied at least one of a temperature-dependent relation and a humidity-dependent relation:
a temperature of the first environment being Ta, a temperature of the second environment being Tb, and the temperature-dependent relation satisfied: $6K \leq |Ta-Tb| \leq 148K$; and a relative humidity of the first environment being RHa, a relative humidity of the second environment being RHb, and the humidity-dependent relation satisfied: $7\% \leq |RHa-RHb| \leq 89\%$.

16. The imaging lens assembly of claim 15, wherein the abbe number of the second lens element is Vd, and the following condition is satisfied:

$8 \leq Vd \leq 22.$

17. The imaging lens assembly of claim 16, wherein the abbe number of the second lens element is Vd, and the following condition is satisfied:

$8 \leq Vd \leq 20.5.$

18. The imaging lens assembly of claim 15, wherein when the imaging lens assembly is in the first environment, the frustum surface and the corresponding structure of the one of the two space adjusting structures are directly contacted.

19. The imaging lens assembly of claim 18, wherein when the imaging lens assembly is in the second environment, the frustum surface and the corresponding structure of the one of the two space adjusting structures are disposed at intervals.

20. The imaging lens assembly of claim 15, wherein when the imaging lens assembly is in the first environment, the frustum surface and the corresponding structure of the other one of the two space adjusting structures are directly contacted.

21. The imaging lens assembly of claim 20, wherein when the imaging lens assembly is in the second environment, the frustum surface and the corresponding structure of the other one of the two space adjusting structures are disposed at intervals.

22. The imaging lens assembly of claim 15, wherein the second peripheral portion comprises a bearing surface vertical to the optical axis, and the bearing surface and the first peripheral portion are directly contacted.

23. The imaging lens assembly of claim 15, wherein on a cross section along the optical axis, an angle between the frustum surface and the spatial frustum surface of the one of the two space adjusting structures is $\theta\gamma$, and the following condition is satisfied:

18 degrees $\leq \theta\gamma \leq 130$ degrees.

24. The imaging lens assembly of claim 15, wherein on a cross section along the optical axis, an angle between the frustum surface and the spatial frustum surface of the other one of the two space adjusting structures is $\theta\delta$, and the following condition is satisfied:

18 degrees $\leq \theta\delta \leq 130$ degrees.

25. The imaging lens assembly of claim 15, wherein a diameter of the first lens element is smaller than a diameter of the second lens element, and the diameter of the second lens element is smaller than a diameter of the third lens element.

26. An imaging lens assembly, an optical axis passing through the imaging lens assembly, and the imaging lens assembly comprising:
a first lens element, comprising:
a first optical effective portion, wherein the optical axis passes through the first optical effective portion; and
a first peripheral portion disposed around the first optical effective portion;
a second lens element, disposed on an image side of the first lens element, and comprising:

a second optical effective portion, wherein the optical axis passes through the second optical effective portion; and a second peripheral portion disposed around the second optical effective portion, and an object-side surface of the second peripheral portion directly contacted with an image-side surface of the first peripheral portion;

a third lens element, disposed on an image side of the second lens element, and comprising:

a third optical effective portion, wherein the optical axis passes through the third optical effective portion; and a third peripheral portion disposed around the third optical effective portion, and an object-side surface of the third peripheral portion directly contacted with an image-side surface of the second peripheral portion; and two space adjusting structures, wherein one of the two space adjusting structures is formed via the first peripheral portion of the first lens element and the second peripheral portion of the second lens element, the other one of the two space adjusting structures is formed via the second peripheral portion of the second lens element and the third peripheral portion of the third lens element;

wherein the one of the two space adjusting structures comprises:

a frustum surface disposed on the object-side surface of the second peripheral portion and disposed around the optical axis, and an object-side end of the frustum surface farther from the optical axis than an image-side end of the frustum surface from the optical axis;

a spatial frustum surface disposed on the object-side surface of the second peripheral portion and disposed around the optical axis, and an object-side end of the spatial frustum surface closer to the optical axis than an image-side end of the spatial frustum surface to the optical axis;

a corresponding structure disposed on the image-side surface of the first peripheral portion and correspondingly disposed on the frustum surface and the spatial frustum surface; and a spatial layer formed between the spatial frustum surface and the corresponding structure, so that the spatial frustum surface and the corresponding structure disposed at intervals;

wherein the other one of the two space adjusting structures comprises:

a frustum surface disposed on the object-side surface of the third peripheral portion and disposed around the optical axis, and an object-side end of the frustum surface closer to the optical axis than an image-side end of the frustum surface to the optical axis; and a corresponding structure disposed on the image-side surface of the second peripheral portion and correspondingly disposed on the frustum surface;

wherein when the imaging lens assembly is in a first environment, a minimum spacing distance between the spatial frustum surface and the corresponding structure of the one of the two space adjusting structures is $G\gamma$; when the imaging lens assembly is in a second environment, the minimum spacing distance between the spatial frustum surface and the corresponding structure of the one of the two space adjusting structures is $G\gamma'$;

an abbe number of the second lens element is Vd, and the following conditions are satisfied:

$$3\ \mu m \le G\gamma' < G\gamma \le 38\ \mu m;\ and$$

$$8 \le Vd \le 29;$$

wherein the first environment and the second environment are satisfied at least one of a temperature-dependent relation and a humidity-dependent relation:

a temperature of the first environment being Ta, a temperature of the second environment being Tb, and the temperature-dependent relation satisfied: $6K \le |Ta-Tb| \le 148K$; and a relative humidity of the first environment being RHa, a relative humidity of the second environment being RHb, and the humidity-dependent relation satisfied: $7\% \le |RHa-RHb| \le 89\%$.

27. The imaging lens assembly of claim 26, wherein the abbe number of the second lens element is Vd, and the following condition is satisfied:

$$8 \le Vd \le 22.$$

28. The imaging lens assembly of claim 26, wherein the abbe number of the second lens element is Vd, and the following condition is satisfied:

$$8 \le Vd \le 20.5.$$

29. The imaging lens assembly of claim 26, wherein when the imaging lens assembly is in the first environment, the frustum surface and the corresponding structure of the one of the two space adjusting structures are directly contacted.

30. The imaging lens assembly of claim 29, wherein when the imaging lens assembly is in the second environment, the frustum surface and the corresponding structure of the one of the two space adjusting structures are disposed at intervals.

31. The imaging lens assembly of claim 26, wherein when the imaging lens assembly is in the first environment, the frustum surface and the corresponding structure of the other one of the two space adjusting structures are directly contacted.

32. The imaging lens assembly of claim 31, wherein when the imaging lens assembly is in the second environment, the frustum surface and the corresponding structure of the other one of the two space adjusting structures are disposed at intervals.

33. The imaging lens assembly of claim 26, wherein the second peripheral portion comprises a bearing surface vertical to the optical axis, and the bearing surface and the first peripheral portion are directly contacted.

34. The imaging lens assembly of claim 26, wherein on a cross section along the optical axis, an angle between the frustum surface and the spatial frustum surface of the one of the two space adjusting structures is $\theta\gamma$, and the following condition is satisfied:

$$18\ degrees \le \theta\gamma \le 130\ degrees.$$

35. The imaging lens assembly of claim 26, wherein a diameter of the first lens element is smaller than a diameter of the second lens element, and the diameter of the second lens element is smaller than a diameter of the third lens element.

36. An electronic device, comprising:

the imaging lens assembly of claim 1, 10, 15 or 26.

* * * * *